March 8, 1966  H. SCHOTTLER  3,238,816
VARIABLE SPEED TRANSMISSION
Filed April 24, 1962  10 Sheets-Sheet 1

INVENTOR.
Henry Schottler,
BY
Byron, Hume, Groen & Clement
Attorneys.

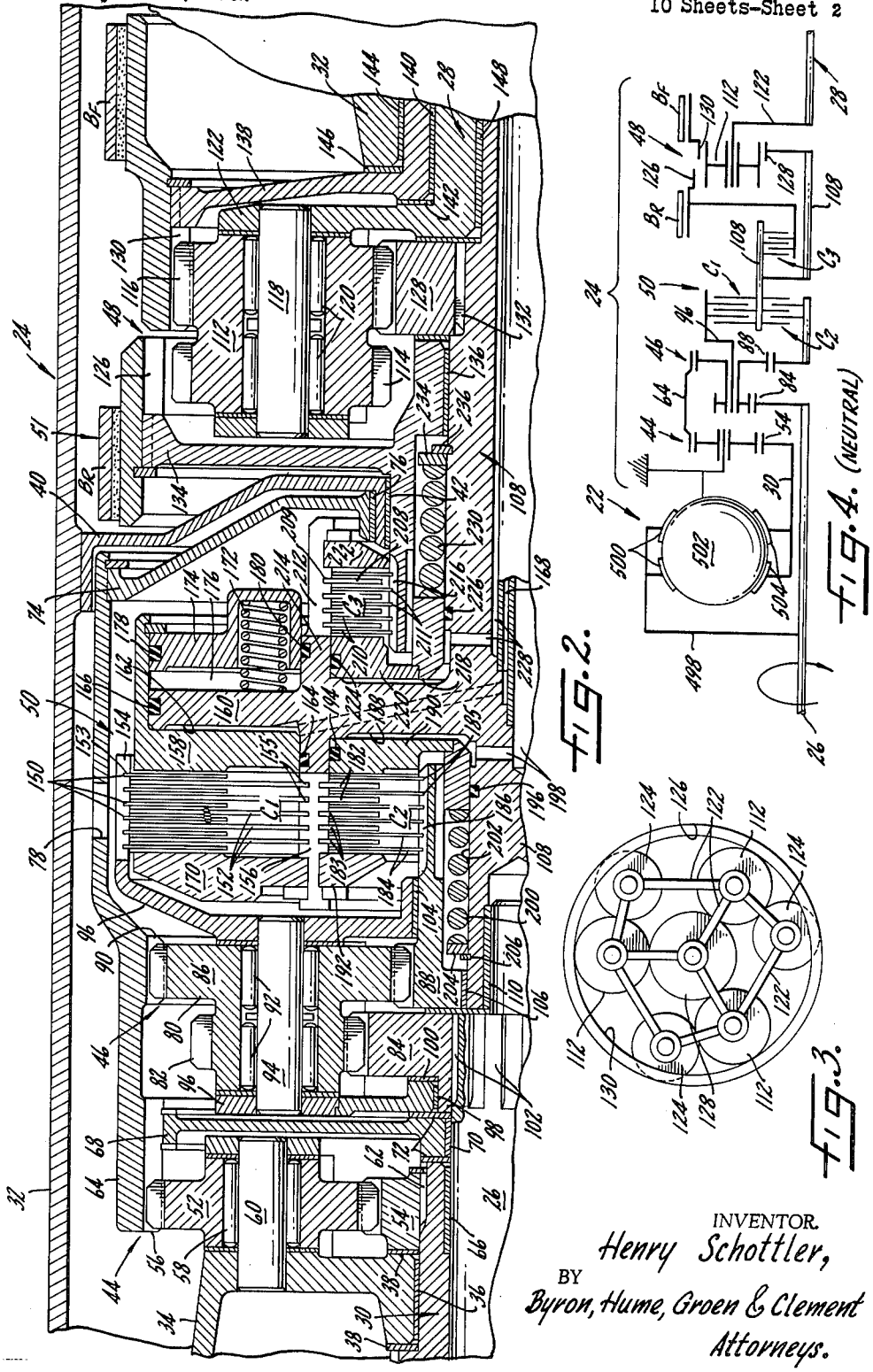

March 8, 1966  H. SCHOTTLER  3,238,816
VARIABLE SPEED TRANSMISSION
Filed April 24, 1962  10 Sheets-Sheet 3
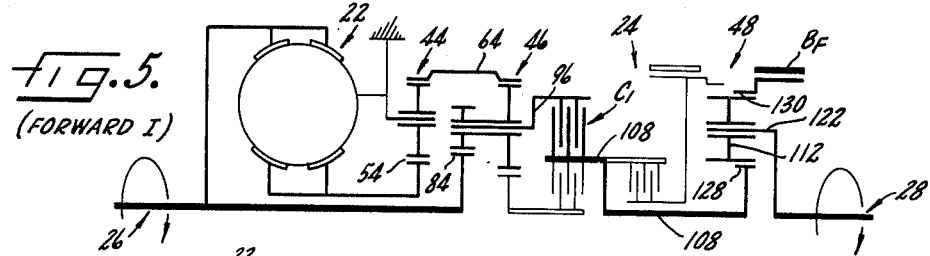
Fig. 5. (FORWARD I)
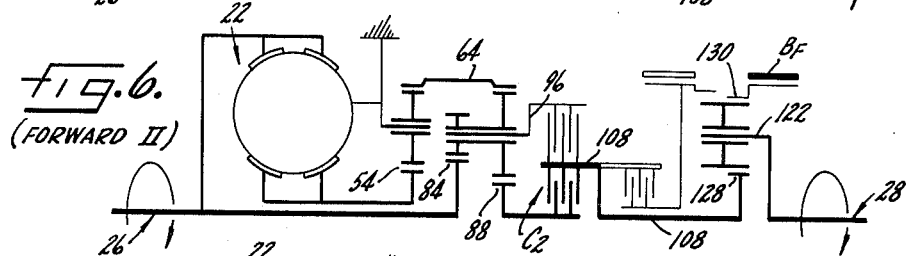
Fig. 6. (FORWARD II)
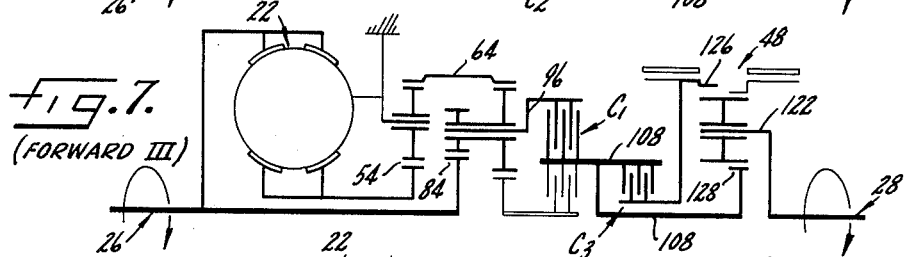
Fig. 7. (FORWARD III)
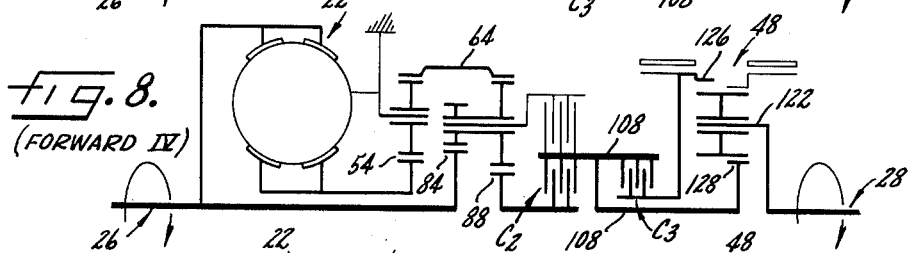
Fig. 8. (FORWARD IV)
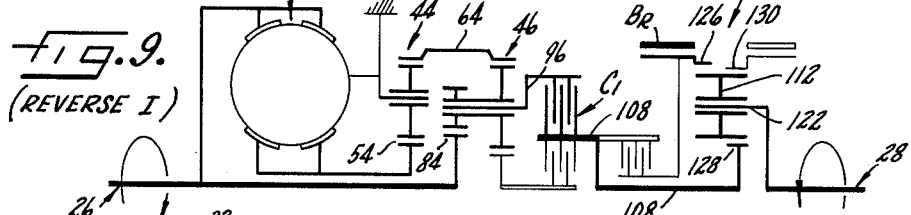
Fig. 9. (REVERSE I)
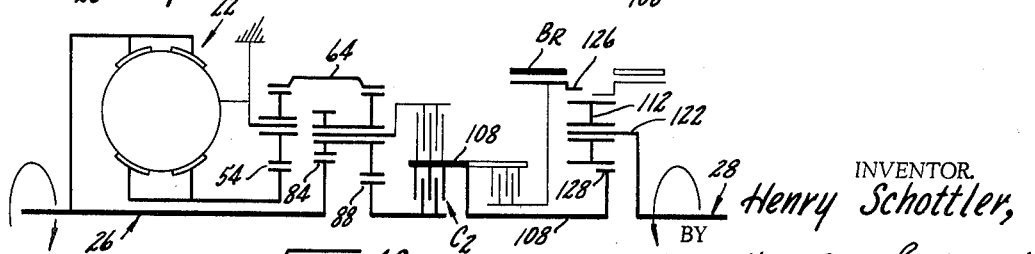
Fig. 10. (REVERSE II)
INVENTOR.
Henry Schottler,
BY Byron, Hume, Groen & Clement
Attorneys.

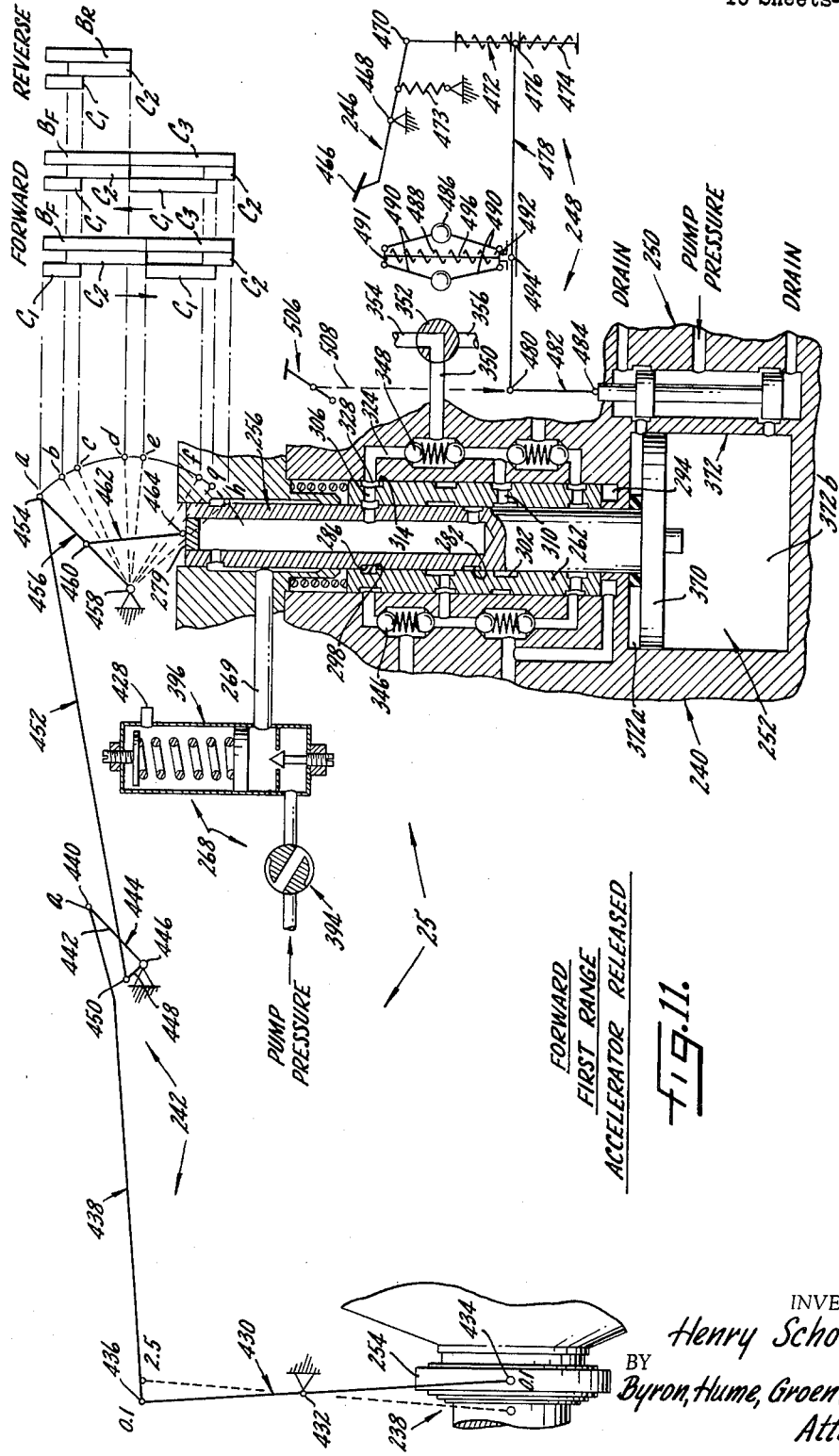

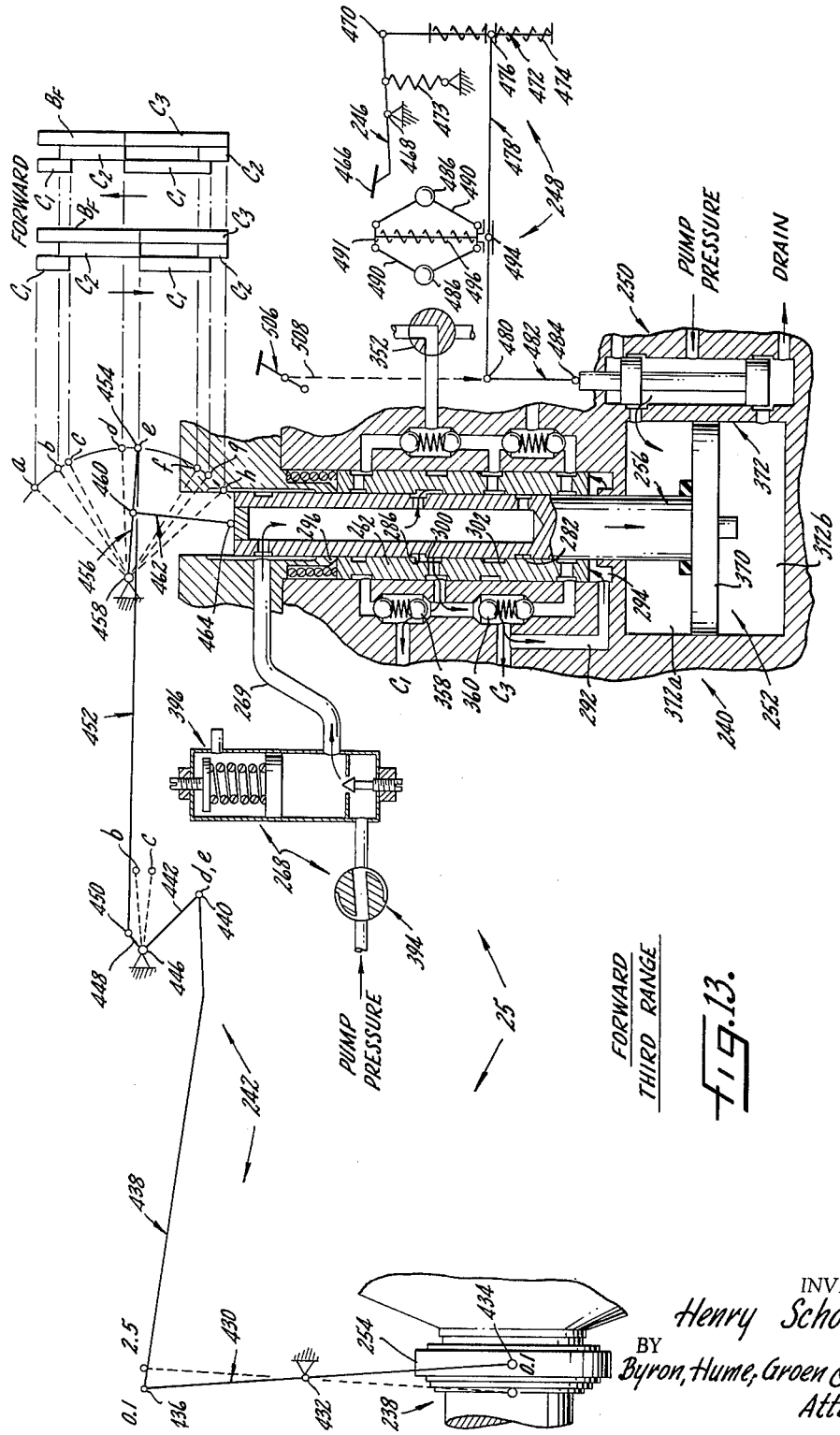

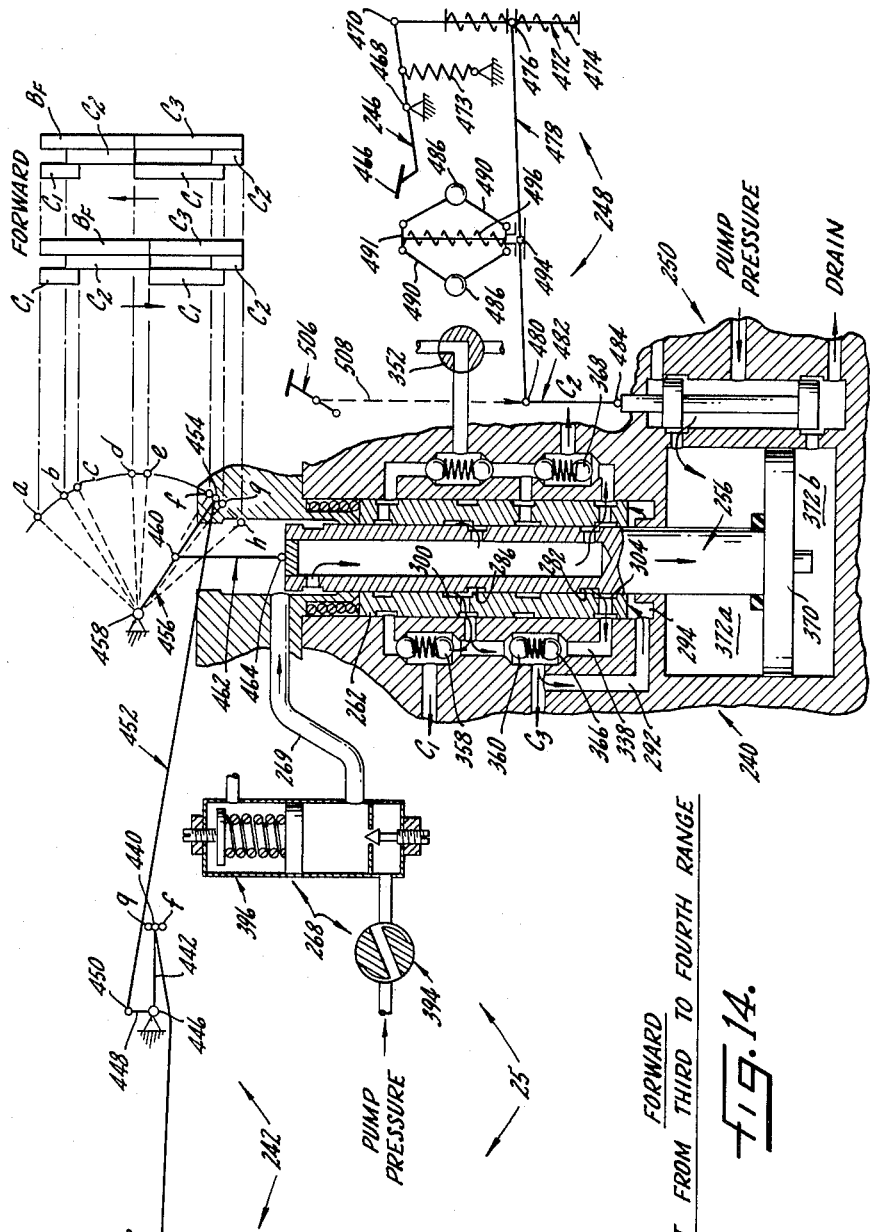

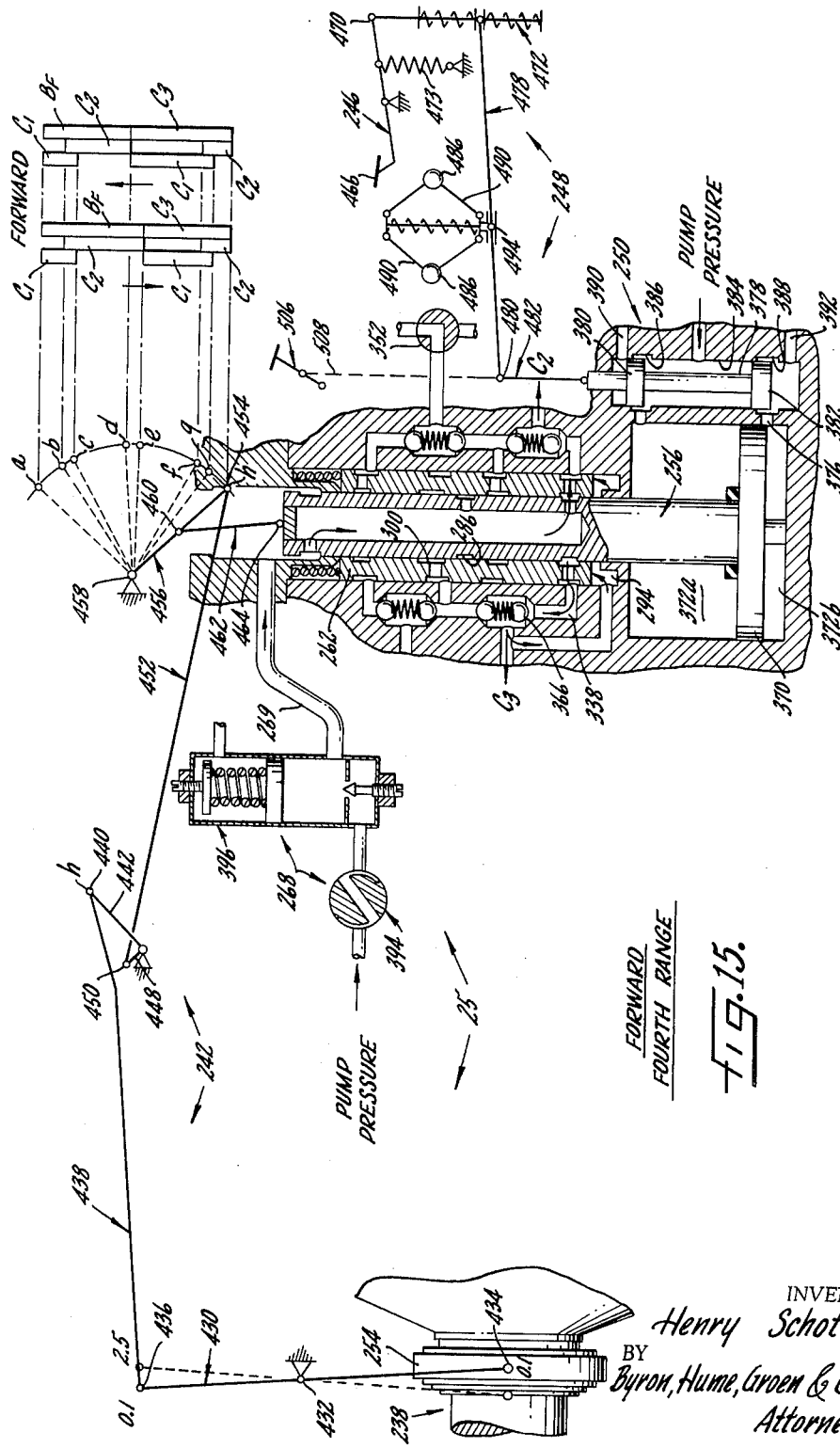

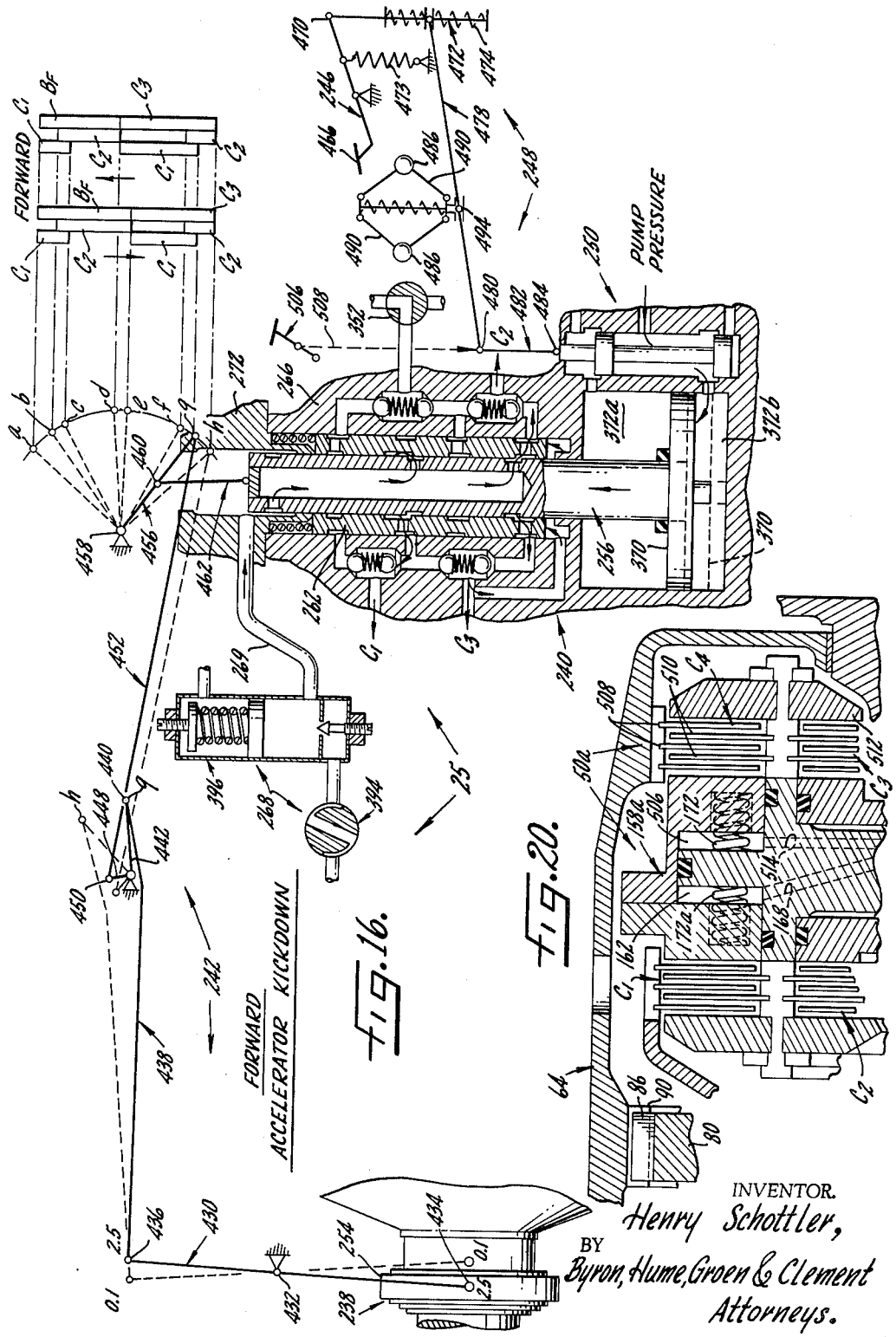

March 8, 1966  H. SCHOTTLER  3,238,816
VARIABLE SPEED TRANSMISSION
Filed April 24, 1962  10 Sheets-Sheet 10

INVENTOR.
Henry Schottler,
BY Byron, Hume, Groen & Clement
Attorneys.

United States Patent Office 3,238,816
Patented Mar. 8, 1966

3,238,816
VARIABLE SPEED TRANSMISSION
Henry Schottler, North Riverside, Ill., assignor, by mesne assignments, to Roller Gear Ltd., Zug, Zug, Switzerland, a corporation of Switzerland
Filed Apr. 24, 1962, Ser. No. 189,924
9 Claims. (Cl. 74—690)

This invention relates to infinitely variable speed drive transmissions. More particularly, the invention relates to a split power path transmission in which varying proportions of the total power carried through the transmission are divided between an infinitely variable speed unit and a gearing unit, in order to increase the drive ratio range and to increase the overall efficiency. The invention also relates to apparatus for controlling ratio changes through the transmission.

The invention disclosed herein is an improvement over the general type of transmission shown in Hans Reichenbaecher, British patent specification No. 757,511, published September 19, 1956.

It is a general object of the present invention to provide an improved infinitely variable speed drive transmission.

Another object of the invention is to provide an improved split power path transmission incorporating an infinitely variable unit in conjunction with a gearing unit.

A further object of the invention is to provide a split power path transmission in which the power flow through the infinitely variable drive portion is arranged in accordance with the load characteristics of the variable drive for best overall efficiency.

Still another object of the invention is to provide an improved power split transmission in which ratio changes in the gearing unit are accomplished without interruption in power flow.

A still further object of the invention is to provide a power split transmission in which ratio changes through the gearing unit portion are accomplished when members with high inertia are synchronized to eliminate jerking at ratio changes.

An additional object of the invention is to provide an improved power split transmission in which little or no power flows through the variable unit at very low speed ratios when the capacity is low, and power flow through the variable unit in the low drive range increases with increasing speed ratio when the capacity of the variable unit is increased.

Another object of the invention is to provide a power split transmission in which the power flow through the variable drive portion can never exceed the permissible power flow through the variable drive.

An important object of the invention is to provide an improved control system for a variable speed drive transmission.

A further object of the invention is to provide a control system for a power split transmission which is completely automatic and which prevents hunting.

Still another object of the invention is to provide an improved transmission for a vehicle in which a substantial portion of vehicle braking is accomplished through drive ratio reduction in the transmission.

Another important object of the invention is to provide an improved vehicle transmission and control system which permits operation of the driving engine at most economical speed at substantially any vehicle speed or load in order to achieve lowest fuel consumption.

Other objects, features and advantages will be apparent from the following detailed description, taken in conjunction with the accompanying drawings, in which:

FIGURE 2 is an enlarged fragmentary sectional view of the gearing portion of the transmission of FIGURE 1;

FIGURE 3 is a reduced size schematic sectional view illustrating the compound planetary gearing arrangement in the rearward gearing portion of the transmission of FIGURE 1;

FIGURE 4 is a reduced size diagrammatic illustration of the transmission of FIGURE 1 showing the transmission in its neutral condition with the drive shaft rotating and the driven shaft stationary;

FIGURE 5 is a diagrammatic illustration similar to FIGURE 4 but illustrating the power flow through the transmission in the lowest or first range of forward drive;

FIGURE 6 is a diagrammatic illustration similar to FIGURE 4 but illustrating the power flow through the transmission in the second range of forward drive;

FIGURE 7 is a diagrammatic illustration similar to FIGURE 4 but illustrating the power flow through the transmission in the third range of forward drive;

FIGURE 8 is a diagrammatic illustration similar to FIGURE 4 but illustrating the power flow through the transmission in the highest or fourth range of forward drive;

FIGURE 9 is a diagrammatic illustration similar to FIGURE 4 but illustrating the power flow through the transmission in the low range of reverse drive;

FIGURE 10 is a diagrammatic illustration similar to FIGURE 4 but showing the power flow through the transmission during the high range of reverse drive;

FIGURE 11 is a schematic illustration of an automatic speed ratio control system for use with the transmission of FIGURE 1 showing the control in its lowest forward drive ratio condition with the driven shaft stationary and the accelerator released;

FIGURE 13 is a schematic illustration showing the control system of FIGURE 11 immediately after changing from second to third range of forward drive;

FIGURE 14 is a schematic illustration showing the control system of FIGURE 11 in condition for changing from third to fourth range of forward drive;

FIGURE 15 is a schematic illustration showing the control system of FIGURE 11 in its highest forward drive ratio condition;

FIGURE 16 is a schematic illustration showing the control system of FIGURE 11 in condition for reducing its forward drive ratio upon accelerator kickdown;

FIGURE 20 is a fragmentary sectional view of an alternative clutching arrangement for use with the power split transmission of FIGURE 1.

Figure 1:
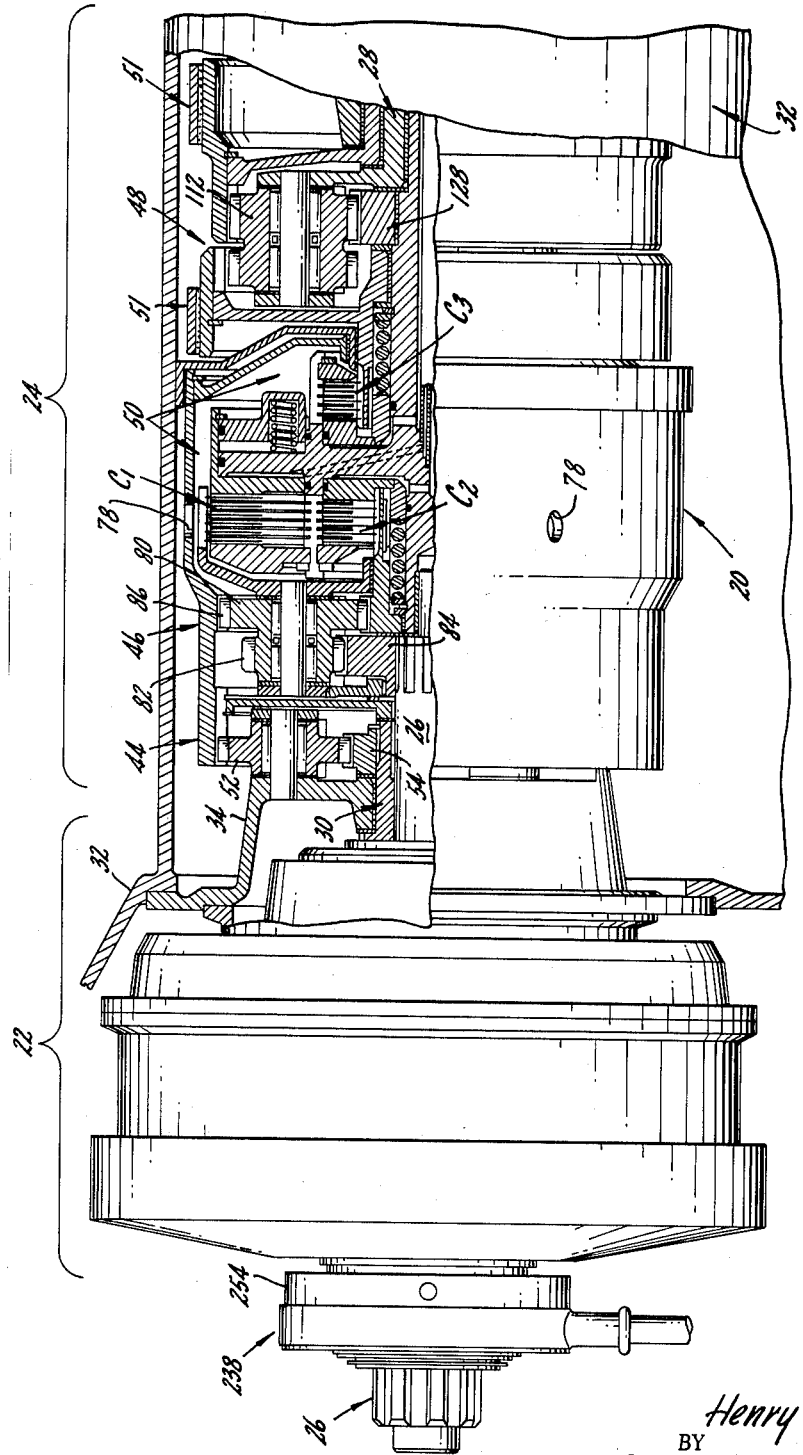
FIGURE 1 is a longitudinal, partially sectional view of a split power path transmission according to the present invention.

The variable speed drive transmission of this invention is generally designated by the reference numeral 20. The transmission may be referred to as a "split power path" transmission or merely a "power split" transmission since it includes an infinitely variable speed frictional drive unit portion 22 acting in conjunction with a stepped variable speed drive gearing unit portion 24. The power from the power source is split and passed through the two units according to a predetermined schedule in order to greatly increase the capacity and efficiency of the transmission. The drive ratios and the power split schedule through the transmission are automatically controlled through a control system 25 illustrated schematically in FIGURES 11 through 16.

*Transmission construction*

Input torque and power are applied to the transmission 20 through a drive or input shaft 26 which may be driven by any suitable prime mover (not shown) such as an internal combustion engine. Output torque and power are taken from the transmission through a driven or output shaft 28.

The infinitely variable speed drive unit 22 may be of any suitable type and construction for providing infinitely variable speed drive ratios between the input shaft 26 and a variable unit output shaft 30. Examples of suitable variable speed units are infinitely variable fractional drives, hydrodynamic torque converters, hydrostatic transmissions and the like. Preferably, however, the variable unit 22 is of the frictional drive type, for example, like those disclosed in my prior patent applications, Serial No. 852,902, filed November 13, 1959, Serial No. 29,035, filed May 13, 1960; and Serial No. 140,397 filed September 25, 1961. The specific embodiment of transmission illustrated in FIGURE 1 utilizes the frictional drive unit described in the latter patent application and provides speed ratios varying from 0.1 to 2.5. In other words, the speed of the variable unit output shaft 30 can be varied from 0.1 to 2.5 times the speed of the input shaft 26, with infinitely variable speed ratios provided therebetween.

The entire transmission 20 is carried within a suitable housing or casing 32 which is shown only fragmentarily and which has an oil sump or reservoir (not shown) at the bottom. The drive shaft 26 and the driven shaft 28 are rotatably supported adjacent their end portions on suitable bearings (not shown) carried by the housing. The variable unit output shaft 30 is rotatably supported by a stationary web member 34 which is fixedly secured to the housing. A suitable bearing sleeve 36 and bearing washers 38 transmit the load from the rotating members to the stationary web. Another stationary supporting web 40 is fixedly secured to the housing rearwardly of the web 34 and rotatably supports other rotating parts of the transmission through a suitable sleeve bearing 42.

The gearing unit 24 includes in general a forward planetary gear set 44, an intermediate planetary gear set 46 and a rearward planetary gear set 48. A plurality of ratio control clutches 50 are located between the intermediate gear set 46 and the rearward gear set 48, and a pair of ratio control brakes 51 are located adjacent the gear set 48. Selective actuation of the clutches and brakes provides four forward drive speed ratio ranges and two reverse drive speed ratio ranges.

The forward gear set 44 includes one or more planet gears 52 which mesh with a variable unit input sun gear 54 and an internal ring gear 56. The planet gears 52 are rotatably mounted on roller bearings 58 carried by stub shafts 60 which, in turn, are fixedly secured to the stationary support web 34. The variable input sun gear 54 is secured by means of mating splines 62 on the end of the variable unit output shaft 30 so that the sun gear 54 is always driven at the output speed of the variable unit 22. The ring gear 56 is integrally formed in a rotatable ring member 64.

The right end portion of the drive shaft 26 is rotatably supported within the end of the variable unit output shaft 30 by means of a suitable sleeve bearing 66 so that radial loads on the end of the input shaft are carried through the sleeve shaft 30 to the support web 34 and thence to the stationary casing 32.

The ring member 64 is rotatably supported of its forward end portion on the right end portion of the output shaft 26 by means of a rotatable support web 68. The ring member is secured to the support web 68, and a suitable sleeve bearing 70 transmits the radial loads between the input shaft and the web 68. Suitable washer bearings 72 axially support the web against the adjacent relatively rotatable members. At its rearward end portion, the ring member 64 is secured to a rotatable support web 74 which is journalled on a portion of the stationary support web 40 by means of a suitable sleeve bearing 76. Lubrication vent ports 78 are formed through the ring member 64 to permit hydraulic lubricaation oil from the gear sets 44 and 46 and from the control clutches 50 to pass back to the sump.

The intermediate planetary gear set 46 includes one or more planet gear clusters 80 each having a relatively small planet portion 82 meshing with an input sun gear 84. An integral relatively large planet gear portion 86 of the planet gear cluster 80 meshes with an intermediate sun gear 88 and with an internal ring gear 90 integrally formed in the ring member 64. The planet gear clusters 80 are rotatably carried by roller bearings 92 on circumferentially spaced support shafts 94 secured in a planet gear carrier 96.

The carrier 96 of the gear set 46 is rotatably supported at its front end on a short hub portion of the sun gear 84 by means of a suitable sleeve bearing 98 with a suitable washer bearing 100 axially spacing the members. In turn, the input sun gear 84 is carried by meshing splines 102 on the right end portion of the drive shaft 26 so that the input sun gear 84 is always driven at the speed of the drive shaft. The rearward portion of the carrier 96 is journalled by means of a suitable sleeve bearing 104 on a hub of the intermediate sun gear 88. The sun gear 88, in turn, is rotatably supported by means of a suitable sleeve bearing 106 on the left end portion of an intermediate shaft 108. The left end of the intermediate shaft 108 is journalled on the right end of the drive shaft 26 by means of a suitable sleeve bearing 110. The right end portion of the intermediate shaft 108 is also rotatably supported in any suitable manner (not shown).

The rearward planetary gear set 48 includes a plurality of circumferentially spaced planetary gear clusters 112 each including a pair of integral planet gears 114 and 116 of equal size. The planetary gear clusters 112 are rotatably carried on respective shafts 118 by means of roller bearings 120. The shafts 118 are fixedly secured in circumferentially spaced relation to a planet gear carrier 122. The carrier 122 is fixedly secured to the driven shaft 28 in any suitable manner, for example, by being integrally formed therewith as shown.

The gear set 48 additionally includes a plurality of planet gears 124 (shown schematically in FIGURE 3) which are rotatably carried by the carrier 122 and which mesh with the respective planet gear portions 114 and with an internal ring gear 126. The planet gear portions 116 are meshed with a rear sun gear 128 and a rear internal ring gear 130. The sun gear 128 is connected by means of splines 132 with the intermediate shaft 108 and, accordingly, always rotates at the same speed as the shaft.

The ring gear 126 is fixedly secured to a support web 134 which is rotatably journalled on the intermediate shaft 108 by means of a suitable sleeve bearing 136. A stationary brake band $B_R$ encircles the outer periphery of the ring gear 126 and is adapted to selectively brake the ring gear when tightened thereabout by actuation of a suitable hydraulic servo (not shown).

The ring gear 130 is fixedly secured to a support web 138 which is rotatably journalled on the driven shaft 28 by means of a suitable sleeve bearing 140 and a washer bearing 142. A portion of the stationary casing 32 overlies the annular bearing rim of the support web 138 and suitable sleeve and washer bearings 144 and 146, respectively, transmit loads of the rotatable members to the casing. The right end portion of the intermediate shaft 108 is rotatably supported within the driven shaft 28 by means of a suitable sleeve bearing 148 disposed between the members. A stationary brake band $B_F$ surrounds a portion of the ring gear 130 in order to selectively brake the ring gear when tightened thereabout by actuation of a suitable hydraulic servo (not shown).

The ratio control clutch portion 50 includes three selectively operable multiple disc friction clutches $C_1$, $C_2$ and $C_3$. The clutch $C_1$, when engaged, couples the carrier 96 to the intermediate shaft 108. The clutch $C_2$, when engaged, couples the intermediate sun gear 88 with the intermediate shaft 108. The clutch $C_3$, when engaged, couples the ring gear 126 to the intermediate shaft 108, and, accordingly, to the rear sun gear 128 in order to lock up the rearward gear set 48 and to provide direct drive between the intermediate shaft 108 and the driven shaft 28.

The clutch $C_1$ comprises a plurality of outer annular friction clutch discs or plates 150 alternately interleaved with a plurality of inner annular friction clutch discs or plates 152. The outer clutch plates 150 are provided with a plurality of circumferentially spaced integral lugs 153 at their outer peripheries which engage in respective slots 154 formed in an annular integral portion of the carrier 96. The inner clutch plates 152 are provided with a plurality of circumferentially spaced integral lugs 155 along their inner peripheries which engage in respective notches 156 formed in an annular web portion of the intermediate shaft 108. An annular piston 158 coacts with an annular rim portion 160 of the intermediate shaft 108 to provide an annular hydraulic pressure chamber 162 therebetween. The pressure chamber 162 is sealed by an inner sealing ring 164 and an outer sealing ring 166. A fluid passage or conduit 168 connects between the pressure chamber 162 and the control system 25.

When pressure is introduced into the chamber 162 of the clutch $C_1$, the piston 158 is pressed against one side of the stack of interleaved plates 150 and 152. A pressure plate 170 is fixedly secured to the intermediate shaft annular web portion on the opposite side of the interleaved stack of clutch plates and provides the necessary reaction back-up for engagement of the clutch $C_1$.

In order to release the clutch $C_1$ when the pressure is relieved in the chamber 162 a plurality of compression springs 172 act between the web 160 and a reaction member 174 secured to the piston 158 on the opposite side of the web 160. The web 160 and the reaction member 174 also provide an annular centrifugal balance chamber 176 which is adapted to be filled with hydraulic fluid to counterbalance the centrifugal effect of the fluid in the pressure chamber 162. The balance chamber 176 is sealed on opposite edges of the reaction member 174 by means of sealing members 178 and 180. Any suitable means (not shown) are provided to maintain the balance chamber 176 filled with hydraulic oil but under no pressure other than which is centrifugally induced when the transmission is operated.

The clutch $C_2$ includes a plurality of outer annular frictional clutch plates or discs 182 which are interleaved with a plurality of inner annular frictional clutch discs or plates 184. The clutch discs 182 are provided with respective circumferentially spaced lugs 183 at their outer peripheries which are engaged in the notches 156 formed in the annular hub portion of the intermediate shaft 108. The inner clutch discs 184 are formed with integral peripherally spaced lugs 185 along their inner peripheries which are engaged in a plurality of peripherally spaced grooves 186 formed in a hub portion of the intermediate sun gear 88. An annular clutch engagement pressure chamber 188 is formed between a portion of the annular web 160 and a piston 190 disposed immediately to the right of the stack of interleaved clutch discs 182 and 184. A clutch pressure plate 192 is fixedly secured to the annular rim portion of the intermediate shaft 108 on the opposite side of the stack of discs to provide a firm reaction back-up for engagement of the clutch. The pressure chamber 188 is sealed by an outer sealing ring 194 and an inner sealing ring 196. A fluid passage or conduit 198 connects between the pressure chamber 188 and the control system 25 for selective engagement of the Clutch $C_2$.

In order to release the clutch $C_2$ when the pressure in the chamber 188 is relieved, a clutch release compression spring 200 is disposed in an annular chamber 202 formed between the hub of the intermediate sun gear 88 and the intermediate shaft 108. One end of the spring 200 bears resiliently against a portion of the piston 190 while the other end bears against a washer 204 which is held in place by a snap-ring 206 secured to the intermediate shaft 108.

The clutch $C_3$ comprises a plurality of outer annular frictional clutch plates or discs 208 interleaved with a plurality of annular inner friction clutch plates or discs 210. The outer clutch discs 208 are provided with a plurality of peripherally spaced outer integral lugs 209 slidably disposed in mating grooves 212 formed in another integral annular rim portion 214 of the intermediate shaft 108. The inner clutch discs 210 are formed with a plurality of integral circumferentially spaced inner lugs 211 which are slidably disposed in mating grooves 216 formed in an annular hub portion of the support web 134 for the ring gear 126 of the rearward gear set 48.

For selective engagement of the clutch $C_3$ an annular hydraulic pressure chamber 218 is formed between a portion of the intermediate shaft web 160 and an annular piston 220. On the opposite side of the stack of interleaved clutch discs 208 and 210, an annular pressure plate 222 is fixedly secured to the intermediate shaft hub portion 214. The pressure plate 222 provides the necessary reaction back-up for engagement of the clutch $C_3$. The pressure chamber 220 is sealed by respective sealing rings 224 and 226. A hydraulic conduit or passage 228 connects the pressure chamber 218 to the control system 25 in order to provide for selective engagement of the clutch.

In order to release the clutch $C_3$ when the pressure in the chamber 218 is relieved, a compression clutch release spring 230 is disposed in an annular chamber formed between the hub of the support web 134 and a portion of the intermediate shaft 108. One end of the release spring 230 bears resiliently against a portion of the piston 220 while the other end bears against a washer 234 which is anchored against a snap ring 236 secured to the immediate shaft 108.

The lowest or first range of forward drive between the input shaft 26 and the output shaft 28 is provided when the clutch $C_1$ and the brake $B_F$ are engaged as shown schematically in FIGURE 5. The second range of forward drive is provided when the clutch $C_2$ and the brake $B_F$ are engaged as illustrated in FIGURE 6. The third range of forward drive is provided when the clutches $C_1$ and $C_3$ are engaged as illustrated in FIGURE 7, and the fourth or highest range of forward drive is provided when the clutches $C_2$ and $C_3$ are engaged as shown in FIGURE 8.

The lowest or first range of reverse drive is provided when the clutch $C_1$ and the brake $B_R$ are engaged as schematically shown in FIGURE 9. The second or highest range of reverse drive is provided through engagement of the clutch $C_2$ and the brake $B_R$ as shown in FIGURE 10.

Automatic control system

The automatic control system 25 schematically illustrated in FIGURES 11–16 is intended for use with the transmission 20 when employed in a vehicle in order to automatically control drive ratios between the drive and driven shafts in accordance with vehicle speed and accelerator position.

Figure 17:
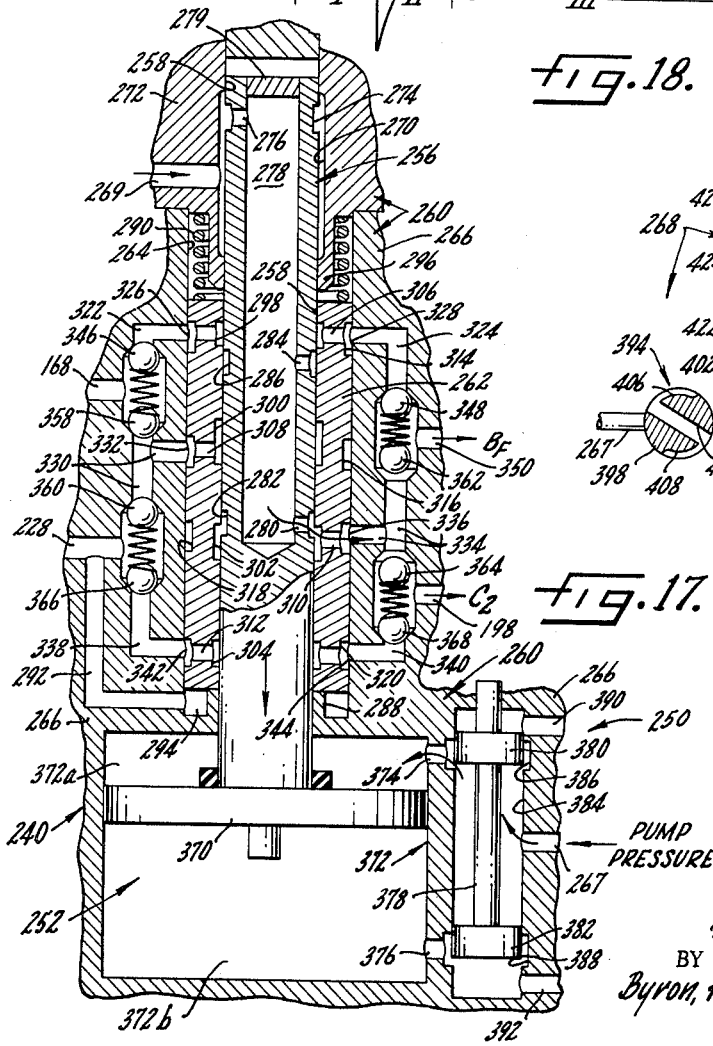
FIGURE 17 is an enlarged schematic sectional view of the control valve portion of FIGURE 11 showing the control in the second range of forward drive position.

Speed ratio control is achieved through a hydraulic control 238 for the variable speed drive unit 22 acting in conjunction with a master control valve 240, FIGURE 17, for the gearing unit 24. The hydraulic control 238 and the master control valve 240 are connected for concurrent operation through a linkage system 242 whereby the position of the master control valve 240 also determines the position of the hydraulic control 238. The master control valve position is determined by a combination of the effects of vehicle speed and accelerator or throttle position through a governor 244 responsive to vehicle speed and an accelerator or throttle 246. The accelerator is also connected in any suitable manner (not shown) for controlling the speed of operation of the vehicle engine (not shown). The combined effects of vehicle speed and throttle position are transmitted through a linkage system 248 to a balance control valve 250 which controls delivery of pump pressure to a master control servo 252. The servo 252 positions the master control valve 240 to determine the speed ratio through the gearing unit 24.

Figure 12:
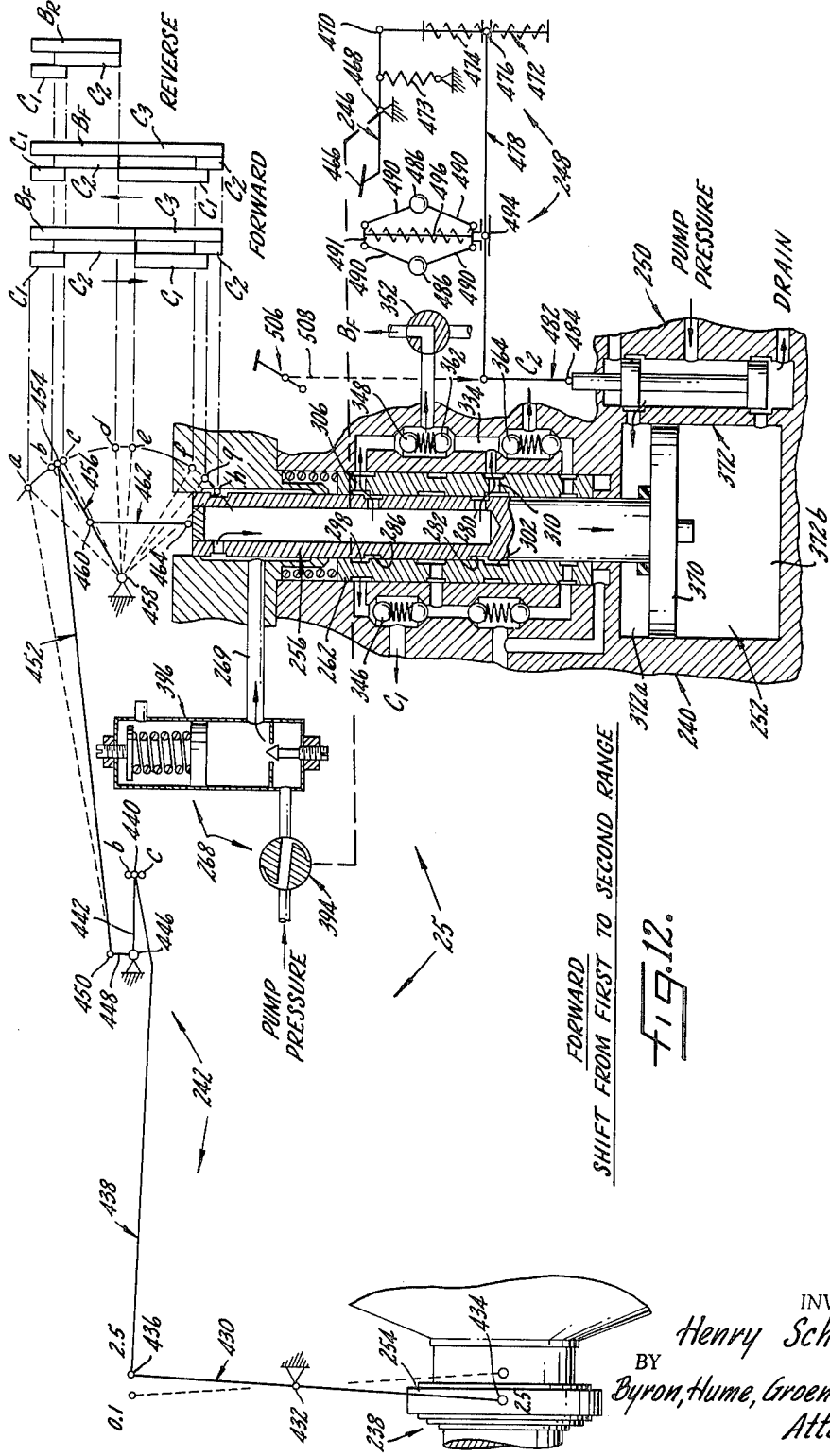
FIGURE 12 is a schematic illustration showing the control system of FIGURE 11 in condition for changing from first to second range of forward drive.

The variable unit hydraulic control 238 may be of any suitable type for controlling the speed ratio in the variable unit 22. The specific control shown is substantially the same as that covered in any copending patent application, Serial No. 140,397, filed September 25, 1961, referred to earlier. This control includes a control ring 254, the position of which determines the drive ratio through the variable unit 22. When the ring 154 is in the extreme left hand position as shown in FIGURES 12 and 14, the speed ratio through the variable unit is 2.5 to 1 (variable unit output shaft 30 relative to input shaft 26). When the control ring 254 is moved to the extreme right hand position as shown in FIGURES 11 and 13, the speed ratio is 0.1 to 1. An infinite range of intermediate speed ratio is provided between these two extreme positions of the control ring.

The master control valve 240 may comprise a valve stem 256 axially shiftably disposed in a close-fitting bore 258 provided in a stationary valve body assembly 260 (only partly shown). Part of the bore is formed through a sleeve portion 262 of the valve body. The sleeve is axially shiftably disposed in a larger close-fitting bore 264 formed in a stationary portion 266 of the valve body assembly.

Hydraulic fluid under pressure is supplied to the master control valve 240 by any suitable means such as a hydraulic pump (not shown). For example, an input shaft pump similar to that disclosed in my copending patent application, Serial No. 140,397, filed September 25, 1961, may be incorporated in the hydraulic control 238. In addition, if desired, a driven shaft hydraulic pump (not shown) may also be employed.

The hydraulic fluid under pressure passes from a delivery conduit 267 through a start control unit 268 to a conduit 269. The conduit 269 delivers pump pressure to an annular cavity 270 formed in another stationary portion 272 of the pump casing assembly 260. The cavity 270 communicates with a top annular groove 274 formed about the upper end portion of the valve stem 256, and the cavity is of sufficient length to maintain this communication regardless of the position of the valve stem throughout the control range. The annular groove 274 communicates through one or more ports 276 with an internal axial bore 278 formed within the valve stem. The bore 278 is closed at its top end by a fixed plug 279. Near its bottom end, the bore 278 communicates by means of a lower port or ports 280 with a bottom annular groove 282 formed about the outer periphery of the valve stem 256. Between the ports 276 and 280, an intermediate port or ports 284 communicates through the valve stem with an intermediate annular groove 286.

The valve sleeve 262 is normally maintained in its lowermost position as shown in FIGURES 11 and 12 against an annular stop 288 by means of a coil compression spring 290 which is disposed in the upper portion of the bore 264 bearing between a shoulder on the stationary casing member 272 and the upper end of the sleeve.

The sleeve 262 is retained in its normal position as shown by the spring 290 except when hydraulic pressure is delivered to the clutch $C_3$ through the conduit 228. In this event, a bleed conduit 292 communicates pressure from the conduit 228 to an annular pressure chamber 294 below the bottom end of the sleeve 262. This pressure shifts the sleeve upwardly against the bias of the spring 290 until the upper end of the sleeve engages an annular stop 296 formed in the stationary portion 272 of the valve casing 260, as shown in FIGURES 13–16. When the pressure in the conduit 228 is again relieved, the spring 290 returns the sleeve 262 to its normal position.

The master control sleeve 262 is provided with a series of four axially spaced internal annular grooves 298, 300, 302 and 304 which are connected by respective ports 306, 308, 310 and 312 with a corresponding set of four external annular grooves 314, 316, 318 and 320. The upper external annular groove 314 of the sleeve 262 communicates with conduits or passages 322 and 324 through respective ports 326 and 328. The groove 314 is of sufficient length to register with the ports 326 and 328 regardless of the axial position of the sleeve 262. The annular groove 316 of the sleeve communicates with a conduit 330 through a port 332 with the length of the groove being sufficient to insure constant communication. The groove 318 communicates with a conduit 334 through a port 336 and here again the length of the groove is sufficient for constant communication. The annular groove 320 of the sleeve communicates with conduits 338 and 340 through respective ports 342 and 344, with constant communication provided.

The conduit 322 is connected through a suitable spring-pressed ball check valve 346 with the conduit 168 which delivers hydraulic pressure to the servo for actuating the clutch $C_1$. The check valve is arranged as shown to permit flow from the conduit 322 to the conduit 168 but to prevent reverse flow.

The conduit 324 is connected through a suitable spring-pressed ball check valve 348 with another conduit 350 which in turn delivers the flow to a two-way valve 352 of any suitable design. The check valve 348 prevents reverse flow from the conduit 350 to the conduit 324 but does not impede forward flow from 324 to 350. The valve 352 is connected to a selector lever (not shown) under the control of the vehicle operator for selecting either forward or reverse drive through the transmission. When forward drive is selected, the valve is in the position shown for delivering hydraulic fluid under pressure to a conduit 354 which leads to the servo (not shown) for actuating the brake $B_F$. When the selector lever is moved to the reverse drive position, the valve 352 is rotated 90° to connect the conduit 350 with a different conduit 356 which delivers hydraulic fluid under pressure to the servo (not shown) which actuates the brake $B_R$.

The conduit 330 is connected through one spring-pressed ball check valve 358 to the conduit 168 and through another spring-pressed ball check valve 360 with the conduit 228 for delivering hydraulic fluid under pressure for the clutch $C_3$ to the servo to actuate this clutch. The check valves 358 and 360 are arranged to permit flow from the conduit 330 to the respective conduits 168 and 228 but to prevent reverse flow.

The conduit 334 is connected through one spring-pressed ball check valve 362 with the conduit 350 and through another spring-pressed ball check valve 264 with the conduit 198 leading to the servo for the clutch $C_2$. The check valves 362 and 264 are arranged to permit flow from the conduit 334 to the respective conduits 350 and 198 but to prevent reverse flow.

The conduit 338 is connected through a spring-pressed ball check valve 366 to the conduit 228, with the check valve arranged to permit flow from the conduit 338 to the conduit 228 but to prevent reverse flow.

The conduit 340 is connected through a spring-pressed ball check valve 368 with the conduit 198, with the check valve being arranged to prevent reverse flow.

The master control servo 252 may comprise a piston member 370 fixedly secured to the bottom end of the valve stem 256 and shiftably disposed in a piston cylinder 372 formed in the valve body assembly 260. The piston head 370 divides the cylinder 372 into an upper servo chamber 372a above the piston and a lower servo chamber 372b below the piston. When hydraulic fluid under pressure is delivered to the servo chamber 372a above the piston head 370 through an upper port 374, the valve stem 256 is moved downwardly (FIGURES 12–14). Conversely, when fluid under pressure is delivered through a lower port 376 to the servo chamber 372b below the piston head 370, the valve stem is moved upwardly (FIGURE 16).

The balance control valve 250 includes a valve stem 378 with axially spaced integral annular valve lands 380 and 382 shiftably disposed in a close-fitting bore 384 formed in the portion 266 of the valve body assembly 260. An annular groove 386 is formed in the wall of the bore 384 adjacent to the land 380, and an annular groove 388 is formed in the wall of the bore adjacent the land 382. The grooves 386 and 388 are slightly narrower in an axial direction than the thickness of the respective lands 380 and 382. The port 374 provides a passage connecting the groove 386 with the upper servo chamber 372a while the port 376 provides a passage connecting the annular groove 388 with the portion of the lower servo chamber 372b. Respective drain passages 390 and 392 connect the bore 384 above the groove 386 and below the groove 388 with the sump (not shown) in the bottom of the transmission casing 32. The central portion of the bore 384 between the grooves 386 and 388 communicates with the conduit 267 which is normally supplied with hydraulic pressure from the transmission hydraulic pump.

When the valve stem 378 is in its normal balanced position as shown in FIGURE 15, the grooves 386 and 388 are blocked by the respective lands 380 and 382 so that pump pressure is confined to the chamber 384 between the valve lands. However, if the valve stem is moved upwardly, pump pressure is communicated into the annular groove 386 and into the upper servo cylinder 372a to move the master control valve stem 256 downwardly, and fluid displaced from the lower servo chamber 372b passes through the port 376 to the groove 388 and then below the land 382 out of the drain 392. Conversely, when the valve stem is moved downwardly from its normal balanced position, pump pressure is communicated to the groove 388 and the port 376 to the lower servo chamber 372b to move the valve stem 256 upwardly and to permit fluid from the upper chamber to exhaust through the drain 390 back to the sump.

Figure 19:
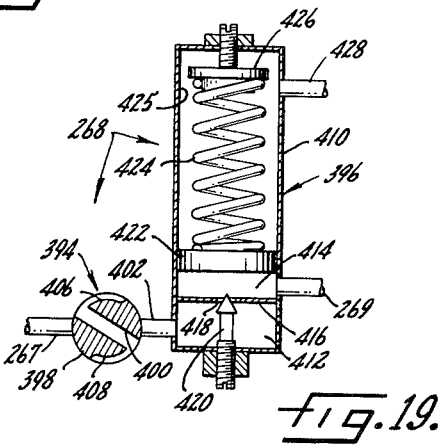
FIGURE 19 is an enlarged schematic sectional view of a start control unit for providing smooth clutch engagement upon initial accelerator depression.

The start control 268 (FIGURE 19) may be of any suitable construction to prevent build-up of pressure in the conduit 269 and in the valve stem bore 278 of the master control valve 240 when the vehicle accelerator 246 is in its released or engine idling position. In addition, the start control 268 provides for a gradual increase of control pressure delivered to the conduit 269 upon depression of the accelerator pedal in order to provide smooth engagement of the clutch $C_1$ and the brake $B_F$ (or $B_R$ for reverse drive) upon initial accelerator depression. The start control includes an accelerator controlled valve 394 acting in conjunction with a dashpot device 396.

The valve 394 includes a valve rotor 398 having a passage 400 therethrough. When the accelerator 246 is in its released or engine idling position (FIGURES 11 and 19), the rotor is so placed that the valve passage 400 does not communicate with the inlet conduit 267 or with an outlet conduit 402 leading from the valve to the dashpot device 396. However, upon initial depression of the accelerator pedal, the valve rotor is rotated in a counter-clockwise direction to open the connection between the valve passage 400 and the inlet and outlet conduits 267 and 402, respectively. Increased accelerator depression provides increased communication area until the valve is full open at about ¼ throttle (FIGURE 12). The valve remains full open with increased accelerator depression up to full throttle (FIGURE 16) by reason of communication grooves 406 and 408 which provide continuous communication with the inlet conduit 267 and the outlet conduit 402, respectively.

In place of the valve 394 which is full closed upon released throttle, a bypass type of valve could be utilized to bypass oil pressure when the accelerator is in the engine idling position while still maintaining continuous communication between the conduits 267 and 269. However, in many instances, it is advantageous to maintain substantial pump pressure upon engine idling in order to opreate various hydraulically actuated vehicle accessories (not shown).

While the throttle valve 394 itself is capable of providing smooth increase in control pressure upon initial accelerator depression and is adequate for some types of vehicles, it is desirable to utilize the dashpot device 396 in conjunction with the throttle valve in order to provide consistently smooth starts regardless of the rate of accelerator depression. The dashpot device 396 includes a casing 410 having an internal pressure chamber 412 and an internal surge chamber 414 separated by a web member 416. An orifice 418 formed through the web member provides communication between the chambers 412 and 414. An adjustable needle valve 420 has a conical portion disposed in the orifice and is axially adjustable for changing the orifice size. A piston member 422 is reciprocably disposed in the casing 410 and is resiliently urged toward the orifice 418 by means of a coil compression spring 424 disposed in a spring chamber 425 behind the piston member. The opposite end of the coil spring is bottomed on an adjustable position spring seat 426 which allows adjustment in the compressive force exerted by the spring 424. The conduit 402 coming from the accelerator valve 394 communicates with the pressure chamber 412. The conduit 269 leading to the master control valve 240 is connected with the surge chamber 414 ahead of the piston 422 so that the two conduits 402 and 269 are in constant communication through the adjustable orifice 418. A drain 428 connects the spring chamber 425 behind the piston 422 with the transmission sump.

Upon depression of the vehicle accelerator 246, the valve 394 opens and transmits hydraulic fluid under pressure to the pressure chamber 412 of the dashpot device 396. It will be noted that the speed with which the pressure builds up in the chamber 412 is dependent upon the amount of accelerator depression. As pressure builds up in the pressure chamber 412, hydraulic fluid passes through the adjustable orifice 418 and pressure begins to fill the surge chamber 414 ahead of the piston 422 which causes the piston to be pressed upwardly against the compression of the spring 424 (FIGURES 12–16). The pressure in the chamber 414 ahead of the piston builds up gradually as the compressive force exerted by the spring increases.

It will be seen that the rate of build-up of pressure in the conduit 269, and accordingly, the rate of clutch engagement is dependent upon the rate and amount of accelerator depression, the size of the adjustable orifice 418 and the compression exerted by the spring 424. These factors controlling pressure build-up can be conveniently adjusted in order to provide the exact initial engagement characteristics desired.

In addition, the start control 268 provides an increasing rate of clutch engagement with increased rate of accelerator depression up to a maximum clutch engagement rate which is controlled through the dashpot device 396. Even if the accelerator is fully depressed almost instantaneously, the dashpot device provides a controlled and predetermined rate of pressure build-up to prevent sudden clutch engagement causing a jerk which would be annoying and which could be harmful to portions of the vehicle engine, the transmission or other parts of the vehicle.

Movement of the master control valve 240 causes predetermined ratio changing in the variable unit hydraulic control 238 through the linkage system 242. The arrangement of the linkage system 242 is such that full movement of the master control valve from its lowest drive ratio position to its highest drive ratio position causes the hydraulic control 238 to change the ratio of the variable speed drive unit 22 from the lowest ratio to the highest ratio and back again to its lowest ratio twice. Thus, lowest ratio drive through the gearing unit 24 corresponds with lowest ratio drive through the variable unit 22 (FIGURE 11), and highest ratio drive through the gearing unit 24 also corresponds with lowest ratio drive through the variable unit 22 (FIGURE 15).

The linkage system 242 includes a first class lever 430 pivotally secured to a fixed central fulcrum 432 and pivotally secured at one end 434 to the control ring 254 of the variable unit hydraulic control 238. The other end 436 of the lever 430 is pivotally secured to a link 438 which has its other end 440 pivotally secured to one arm 442 of a bell crank lever 444. The bell crank lever is pivotally secured at a central fixed fulcrum 446 and has another arm 448 pivotally secured at its end 450 to a link 452. The other end 454 of the link 452 is pivotally secured to the outer end of a class three lever 456. The opposite end of the lever 456 is pivotally secured to a fixed fulcrum 458. An intermediate pivot 460 on the lever 456 is pivotally secured to one end of a link 462. At its opposite end the link 462 is pivotally secured at 464 to the fixed plug 279 at the top end of the master control valve stem 256.

Any suitable linkage may be utilized in place of the linkage system 242 which will achieve the desired pattern of drive ratios through the units 22 and 24 in accordance with the drive ratio schedule shown in FIGURES 11–16. Furthermore, any other suitable type of differential control which is capable of achieving the control pattern shown may be employed in place of the linkage system. However, it will be seen that the linkage system 242 is particularly well adapted to efficiently coordinate the control movements and provide the required control pattern.

The linkage system 248 controls the position of the balance control valve 250 in accordance with accelerator position and vehicle speed. The vehicle accelerator 246 includes a footpedal 466 at one end and is pivotally secured intermediate its ends to a fixed pivot 468. The opposite end of the accelerator is pivotally secured at 470 to a link 472. A tension spring 473 is secured to the accelerator 246 intermediate the pivots 468 and 470 to resiliently urge the accelerator toward its released position corresponding to idling speed of the vehicle engine (not shown). This link is resiliently connected by means of balance springs 474 to a pivot 476 at one end of a balance control lever 478. The opposite end of the lever 478 is pivotally connected at 480 to a link 482. The link 482 is pivotally connected at its bottom end 484 to the top end of the balance control valve 250.

The governor may be of any suitable type for sensing the speed of the output shaft 28 and, hence, the vehicle speed. For example, the governor may be of the conventional fly ball type, comprising fly balls 486 which are resiliently urged toward each other by a compression spring 488 and pivotal links 490. The upper links 490 are pivotally secured to a rotatable but axially fixed member 491. The bottom links 490 are pivotally connected to an axially shiftable, rotatable member 492 which is pivotally associated at a point 494 with the balance control lever 478. The links and the fly balls are symmetrically disposed about a rotatable governor shaft 496 which is secured at its top end to the member 491. The governor shaft is driven by the driven shaft 28 in any suitable manner (not shown), so that the balls are urged away from one another by increased centrifugal force with increasing vehicle speed. Centrifugal force is opposed by the compressive force of the spring 488 tending to slide the member 492 downwardly on the shaft 496 and to move the fly balls toward one another.

*Transmission mechanical operation*

The mechanical operation of the transmission is best understood by reference to the schematic drawings FIGURES 4 through 10, in conjunction with FIGURES 1 and 2. In order to simplify explanation of the operation, parts will be indicated as rotating forward when they rotate in the same direction as the input shaft 26, and when they rotate in the opposite direction they will be indicated as rotating in reverse.

In the transmission of this invention the input torque of the input shaft 26 is "split" and transmitted partly through the variable unit 22 and partly through the gear unit 24. A portion of the input torque is transmitted directly to the gear unit 24 through the input sun gear 84 of the intermediate planetary gear set 46. The remainder of the input torque is directed to the variable unit 22 through an input member 498 (schematically illustrated) which is driven by the input shaft 26. Torque is delivered from the variable unit to the gear unit through the variable unit input sun gear 54. The torque delivered through the respective sun gears 54 and 84 is recombined in the gear sets 44 and 46 by selective engagement of the ratio control clutches 50 and is delivered through the rearward gear set 48 to the driven shaft 28.

In the variable unit 22 the input member 498 drives a pair of outer race members 500 which frictionally engage and drive a plurality of drive balls 502. The drive balls 502 are maintained in fixed circumferential positions relative to one another and frictionally engage a pair of inner races 504 to drive these inner races in the reverse direction at a speed ratio depending upon the control setting. The inner races 504 are drivingly coupled to the variable unit output shaft 30, so that they drive the variable unit input sun gear 54 in a direction opposite to the direction of rotation of the input sun gear 84. For a more detailed explanation reference is made to my prior application Serial No. 140,397 referred to earlier.

Figure 18:
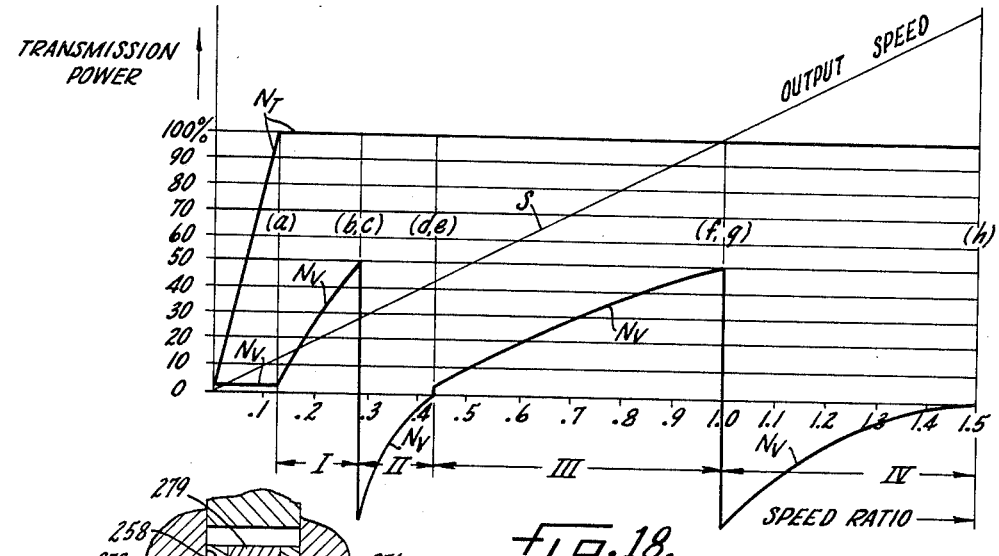
FIGURE 18 is a graphical illustration plotting performance of the power split transmission of FIGURE 1 for the entire range of forward drive.

FIGURE 18, which will be referred to in this explanation, is a plot of transmission power versus transmission speed ratio. The speed ratio is output shaft speed divided by the input shaft speed. In this figure the symbol $N_T$ is applied to a line representing the total transmission power and the symbol $N_V$ is applied to a line designating the portion of the power being transmitted through the variable unit 22. Thus, the difference between $N_T$ and $N_V$ at any particular speed ratio represents the portion of power being transmitted through the gearing unit 24. The positions of the master control valve 240 which correspond to the speed ratios are indicated by the letters in parentheses.

Rotation of the variable unit input sun gear 54 in the reverse direction causes rotation of the ring member 64 in the forward direction at a speed depending upon the drive ratio through the variable unit 22 and the ratio of the gearing in the forward planetary gear set 44. At the same time the input sun gear 84 is rotating in the forward direction. Consequently, carrier 96 is rotated forwardly at a speed depending upon the relative speed of rotation between the sun gear 84 and the ring member 64.

In the first range of forward drive (FIGURE 5) the clutch $C_1$ couples the carrier 96 to the intermediate shaft 108 so that the sun gear 128 of the rear planetary gear set 48 is driven forwardly at the same speed as the carrier. The brake $B_F$ is engaged to hold the ring gear 130 stationary, and the carrier 122 is driven forwardly at a reduced ratio depending upon the gear ratio in the gear set 48. Since they are integral, the carrier 122 drives the driven shaft 28 in the forward direction at the same speed. It will be seen that the speed of rotation of the output shaft 28 increases as the drive ratio through the variable unit 22 is increased, since an increase in drive ratio causes an increase in reverse speed of rotation of the variable unit input sun gear 54 which causes an increase in forward speed of rotation of the ring member 64. Referring to FIGURE 18 it will be noted that the overall drive ratio in the first range of forward drive increases from about 0.125 to about 0.29 as the drive ratio in the variable unit increases from 0.1 to 2.5. The gear ratios are such that when the variable unit reaches its maximum 2.5 ratio, the ring member 64 and the gear unit input sun gear 84 are rotating at the same rate of speed so that the intermediate gear set 46 is "locked up" and all parts are rotating at the same speed. Accordingly, all of the reduction is obtained through the rear planetary gear set 48.

At this point the clutch $C_2$ is engaged and the clutch $C_1$ is disengaged to place the transmission in the second range of forward drive (FIGURE 6). This action disengages the carrier 96 and couples the intermediate sun gear 88 to the intermediate shaft 108. It will be noted that no slippage of clutches is required since at the shift point from first range to second range the sun gear 88 is rotating in the forward direction at the same rate of speed as the ring member 64.

The drive ratio in second range is increased by reducing the drive ratio through the variable unit 22, thus causing the ring member 64 to slow down. The result is that the intermediate sun gear 88 is driven forwardly at an overdrive rate of speed with respect to the sun gear 84. The gear ratios are such that the overall drive ratio from the drive shaft 26 to the driven shaft 28 increases from 0.29 to 0.43 FIGURE 18) as the drive ratio through the variable unit 22 decreases from 2.5 to 0.1.

After maximum speed ratio has been obtained in the second range, the shift to third range is achieved by disengaging the clutch $C_2$ and the brake $B_F$ and engaging the clutches $C_1$ and $C_3$ (FIGURE 7). This necessitates that the intermediate shaft 108 be immediately decelerated and the ring gear 126 be accelerated until they are synchronized in speed with the carrier 96 and the driven shaft 28, which at this point are rotating in the forward direction at the same speed. It will be noted that the carrier 96 and the ring gear 126 are parts of very low inertia compared to the drive shaft and driven shaft. Since all members with high inertia are synchronized at the shiftpoint between the second and third range, no jerk will occur at the shiftpoint.

As the speed ratio through the variable unit 22 is increased in the third range of forward drive, the forward speed of the ring member 64 is increased in the same manner as it was in the first range of forward drive, causing an increase in forward speed of rotation of the intermediate shaft 108. In third range, however, the rear gear set 48 is locked up so that increase in speed of the intermediate shaft results in further increase in forward speed rotation of the driven shaft 28. As the speed ratio through the variable unit 22 is increased from 0.1 to 2.5 the overall speed ratio between the drive shaft 26 and the driven shaft 28 increases from 0.43 to 1.0 (FIGURE 18) so that at the highest speed ratio in the third range, direct drive is provided between the drive and driven shafts.

In order to shift to fourth or highest range of forward drive the clutch $C_2$ is engaged and the clutch $C_1$ is again disengaged, with the clutch $C_3$ remaining in engagement. The drive ratio through the variable unit 22 is then decreased again causing a decrease in speed of rotation of the ring member 64 as in the second range of forward drive, so that the intermediate shaft 108 is again driven at an overdrive ratio with respect to the input shaft 26. In the fourth range, however, the rear gear set 48 is still locked up so that the overdrive of the intermediate shaft 108 is transmitted directly to the driven shaft 28 resulting in forward overdrive of the driven shaft. As the drive ratio through the variable unit is reduced from 2.5 to 0.1, the overall drive ratio through the transmission is increased from direct drive to 1.5 overdrive of the driven shaft (FIGURE 18). This is the highest drive ratio obtainable with the particular transmission embodiment shown, but it will be understood that the maximum drive ratio can be increased or decreased as desired by changing the gear ratios and/or the drive ratio through the variable unit 22.

In order to drive the vehicle in the first range of reverse drive after the vehicle has been brought to a halt, the clutch $C_1$ and the brake $B_R$ are engaged. This provides the same drive condition through the gear sets 44 and 46 as in the first range of forward drive, so that the intermediate shaft 108 is driven forwardly at a relatively slow but increasing speed as the speed ratio through the variable unit 22 is increased. However, in reverse drive engagement of the brake $B_R$ causes the carrier 122 to be driven in the reverse direction through the compound planetary gears 114 and 124. By reason of the gearing arrangement the maximum speed ratio in reverse in the first range is lower than the maximum speed ratio in the first forward range of drive. Maximum drive ratio is achieved when the ring member 64 and the sun gear 84 are synchronized in speed when the speed ratio through the variable unit 22 reaches the maximum 2.5 value.

The shift to second range of reverse drive is achieved by engaging the clutch $C_2$ and disengaging the clutch $C_1$ leaving the brake $B_R$ engaged. This causes an increase in driving speed of the intermediate shaft 108 in the same manner as in the second range of forward drive as the speed ratio through the variable unit 22 is decreased from a maximum ratio to the minimum ratio. At the minimum ratio drive through the variable unit the intermediate shaft 108 is driven forwardly at a 1.5 overdrive ratio but the compound planetary gearing in the gear set 48 reverses the direction of rotation of the carrier 122 and the output shaft 28 and provides a substantial reduction in speed ratio. Accordingly, the maximum speed ratio in the second range of reverse drive is less than the maximum speed ratio in the second range of forward drive.

*Overall operation with automatic control*

When the transmission of FIGURE 1 is controlled by the automatic control system shown in FIGURES 11–16, vehicle speed and direction are controlled in much the same manner as it is in vehicles using present day automatic transmissions. For safety reasons the engine control system (not shown) is arranged so that the engine can be started only when the transmission selector lever is in the "neutral" position. In order to drive the vehicle the operator selects either "forward" or "reverse." From then on all vehicle speed control is achieved through the accelerator and the vehicle brake in the normal manner.

To drive the vehicle in the forward direction the operator shifts the selector lever into the "forward" position. With the accelerator in released position (FIGURE 11) the vehicle does not move since the throttle valve 394 prevents delivery of fluid pressure to the brakes and clutches. However, upon slight depression of the accelerator to increase the driving engine speed slightly, the throttle valve 394 begins to open and the start control device 268 provides a smooth, gradual increase of pressure delivered to the master control valve 240. At this time the master control valve is in the position "a" as shown in FIGURE 11 because the balance control valve 250 is held slightly down from its normal balance position by the governor 244 when the vehicle is stationary or is moving very slowly. Since the balance control valve 250 is connected directly to the pump, by-passing the start control 268, pump pressure is always delivered to the valve 250 as long as the vehicle engine is operating. This insures that the master control valve 240 remains in the position "a" until sufficient vehicle speed has been achieved to move the balance control valve 250 upwardly.

With the master control valve 240 is position "a" pump pressure is delivered to the clutch $C_1$ and the brake $B_F$. Through the action of the start control 268 these two engagement devices are engaged at a rate depending upon the rate of accelerator depression. In other words, rapid accelerator depression, which causes rapid increase in engine speed, also causes relatively rapid rate of engagement of the clutch $C_1$ and the brake $B_F$ in order to cause a relatively fast start. The start control 268 insures that the rate of engagement is quite smooth, and limits the maximum rate so that no jerk occurs. The servos for the brake and clutch are preferably constructed so that the brake engages more rapidly in order that the torque pick up is achieved through slippage in the clutch $C_1$. It will be noted that this clutch is of somewhat larger capacity than the other clutches for this purpose. However, the period of clutch slippage is very short since full engagement of the clutch $C_1$ with the master control valve 240 in the position "a" provides only a 0.125 drive ratio (FIGURE 18). After the clutch $C_1$ and the brake $B_F$ are fully engaged at position "a," it will be noted that practically all of the transmission power is being delivered through the gearing unit 24. This is because the variable unit 22 is operating at its minimum ratio, 0.1.

As the vehicle speed increases in the first range of forward drive, the governor 244 moves the pivot 494 upwardly to thereby move the balance control valve 250 upwardly until the valve is moved beyond the balance point, so that pump pressure is introduced into the servo chamber 372a. This causes the master control valve 240 to be moved downwardly. When the valve stem has been moved downwardly a sufficient amount so that position "b" is reached, the valve stem groove 282 begins to communicate with the sleeve groove 302 to introduce pump pressure to the servo for actuating and engaging the clutch $C_2$, as seen in FIGURE 12.

During movement from position "a" to position "b" the linkage system 242 moves the variable unit control ring 254 from its lowest ratio setting to its highest ratio setting, so that the variable unit ratio is changed smoothly from 0.1 to 2.5. When position "b" is reached, the ring member 64, the carrier 96, and the sun gear 88, are all rotating at the same speed as the clutch $C_2$ begins to engage. This is the condition shown in FIGURE 12 where the accelerator is depressed about one quarter of the total travel and the vehicle has reached about one-eighth of its maximum speed. Since the clutches $C_1$ and $C_2$ are both engaged in the narrow range between positions "b" and "c" there is no interruption of torque through the transmission during the shift from first to second range of forward drive.

The overlapping of engagement of the clutches $C_1$ and $C_2$ is depicted in the block diagram labeled "Forward" in FIGURES 11–16. In this diagram the shaded blocks indicate the ranges during which the various clutches and brakes are engaged.

When position "c" is reached in the control, the transmission is in the second range of forward drive. Communication between the valve stem groove 286 and the sleeve groove 298 is cut off, so that the servo for clutch $C_1$ is no longer subjected to fluid pressure and the clutch spring releases the clutch $C_1$. At this position the variable unit 22 is still in its maximum drive ratio condition because of arrangement of the linkage system 242.

As the master control valve 240 continues to move downwardly in the second range from position "c" toward position "d," the linkage system 242 moves the variable unit control ring 254 back toward the minimum ratio position. It will be noted that the brake $B_F$ remains in engagement by reason of fluid pressure furnished through the conduit 334. The check valve 348 is now closed while the check valve 362 is open. The master control valve is positioned in the second range condition as seen in FIGURE 17.

When position "d" has been reached, the linkage system 242 has moved the control ring 254 to the minimum ratio position again, so that the carrier 96 and the output shaft 28 are now synchronized in speed. However, with the valve sleeve 262 in its lower position no shift occurs because the clutch $C_2$ and the brake $B_F$ are still supplied with fluid pressure. Thus the valve stem continues to move downwardly until position "e" is reached. It will be noted that the variable unit 22 stays in the minimum ratio condition between positions "d" and "e" because of the arrangement of the linkage system 242.

At position "e" of the master control valve the transmission upshifts from second to third range of forward drive and the control system achieves the condition shown in FIGURE 13. Communication is cut off between the valve groove 282 and the stem groove 302 so that fluid pressure is cut off from the clutch $C_2$ and the brake $B_F$. Simultaneously, the valve groove 286 comes into communication with the sleeve groove 300 to introduce fluid pressure to the servos for the clutch $C_1$ and the clutch $C_3$. At this same moment fluid pressure is introduced through the conduit 292 to the annular groove 294 below the valve sleeve 262 to immediately shift the valve sleeve upwardly against the stop 296. This insures immediate introduction of full pressure into the servos for the clutches $C_1$ and $C_3$ and provides very fast engagement of the clutches to prevent any interruption in power. The intermediate shaft 108 is immediately decelerated and the ring gear 126 is immediately accelerated until they are both synchronized with the already synchronized carrier 96 and output shaft 28. At the position "e," therefore, the transmission is shifted almost instantaneously into the third range of forward drive.

During movement of the master control valve 240 from position "e" to position "f" in the third range of forward drive, the clutches $C_1$ and $C_3$ remain in engagement, and the linkage system 242 moves the variable unit control ring 254 from the minimum ratio position to the maximum ratio position to increase the overall transmission speed ratio from 0.43 to 1.0 (direct drive). As the position "f" is reached, communication is established between the valve stem groove 282 and the sleeve groove 304 to cause delivery of pressure fluid to the servo for the clutch $C_2$ to engage this clutch. The shift from third to fourth range of forward drive is achieved in the narrow range of movement of the control from position "f" to position "g." In this narrow shift range the variable unit 22 remains in maximum ratio position, and the clutches $C_1$ and $C_2$ and $C_3$ are all engaged. This is the condition illustrated in FIGURE 14.

As the control reaches the position "f" the ring 64, the carrier 96, and the sun gear 88 are synchronized in speed so that no jerk is possible when the clutch $C_2$ is brought into engagement while the clutch $C_1$ remains engaged. Since the clutches $C_1$ and $C_2$ overlap in their engagement between position "f" and position "g" as they do between positions "b" and "c" in the 1–2 shift, there is no interruption of power in the transmission during the 3–4 shift.

As position "g" is reached communication between the valve stem groove 286 and the sleeve groove 300 is cut off. Accordingly, the servo for the clutch $C_1$ is no longer supplied with pressure fluid so that this clutch is again disengaged by the clutch spring. However, the clutch $C_3$ remains in engagement since it is now supplied with pressure fluid through the conduit 338. The transmission is now in the fourth range of forward drive.

As the control valve 240 continues on its downward movement in the fourth range of forward drive, the clutches $C_2$ and $C_3$ remain in engagement and the linkage system 242 gradually moves the variable unit control ring 254 from the maximum ratio position back to the minimum ratio position. This causes the overall drive ratio in the transmission to change from 1.0 to 1.5, the latter being the maximum ratio achieved when the master control valve reaches the position "*h.*" This is the condition illustrated in FIGURE 15 where the accelerator is in approximately half throttle position and the vehicle has reached approximately half of its maximum speed. It will be noted that additional speed increases tend to move the balance control valve 250 farther upwardly, but this will have no effect on the control as long as the master control valve 240 is in its position "*h,*" since the piston 370 now engages the bottom stop.

During ordinary driving normal changes in speed or accelerator position do not alter the position of the control so that the master control valve remains in the position "*h.*" However, if the accelerator is depressed an abnormal amount during cruising in order to climb a fairly steep incline or to accelerate the vehicle sufficiently to pass another vehicle, the balance control lever 478 is pivoted counterclockwise a sufficient amount to move the balance control valve 250 below its normal balance position. When this happens pressure is introduced again into the servo chamber 372*b* causing the master control valve 240 to be moved upwardly. This causes an increase in the speed ratio through the variable unit 22 which decreases the overall speed ratio through the transmission to increase the available torque. At the same time, of course, the engine speed is increased to further increase the available torque. This is the condition shown in FIGURE 16 where the accelerator is at full throttle and the vehicle is traveling at about one half speed.

If the accelerator is held in the position shown in FIGURE 16, the master control valve will continue its upward movement until the position "*g*" is reached by the master control valve, which will cause the clutch $C_1$ to be engaged. However, it will be noted that the clutch $C_2$ remains in engagement inasmuch as the sleeve 262 is held in its upward position. The clutch $C_2$ remains in engagement until the position "*f*" is reached on downshift, at which time the clutch $C_2$ disengages, and the transmission is shifted to the third range of forward drive. If the conditions are such that full throttle still holds the balance control valve 250 below its balance position the transmission will continue to reduce in ratio in the same manner that the ratio was increased but in a reverse direction. The downshifting, or ratio reduction, will continue until the governor 244 and the accelerator 246 achieve a position of the balance control lever 478 which places the balance control valve 250 at its balance position. At the balance position there is no further movement of the master control valve 240 and, accordingly, there is no further ratio changing.

Thus, a condition of relatively low speed and heavy accelerator depression can cause a downshift, or an "accelerator kickdown," in order to provide more torque. Such an accelerator kickdown is possible at any position in the control range except in the lowest range.

It will be seen that the transmission will downshift through action of the governor 244 even with the accelerator only lightly depressed, or even released, when the vehicle speed has been reduced sufficiently that the governor causes the balance control valve 250 to be moved below its balance condition. However, by reason of the arrangement of the control linkage 248, a governor downshift with light throttle will occur at a substantially lower speed than a downshift at the same point caused by accelerator kickdown. This is because the position of the accelerator as well as the position of the governor effect the position of the balance control valve 250. Thus, a governor downshift will occur at a higher speed with a heavy throttle than it will with a light throttle.

It will be noted that the effect of the governor on position of the balance control valve 250 is more pronounced than the effect of the accelerator inasmuch as the pivot point 494 of the governor is considerably closer to the control valve pivot point 480 than is the pivot point 476 of the accelerator. For this reason a relatively small change in vehicle speed will cause a ratio change in the transmission while a considerably larger change in accelerator position is required to cause the same ratio change.

By reason of the arrangement of the control linkage 248 it will be seen that the vehicle speed at which ratio change occurs depends upon accelerator position. In other words, if a relatively heavy throttle is held, the 1–2 shift and 2–3 shift and 3–4 shift will occur at fairly high vehicle speeds. On the other hand, with a relatively light throttle these shifts will occur at lower speeds and the rate of vehicle acceleration will be slower because the engine speed will be relatively lower with lower torque available for acceleration.

Inasmuch as the clutches $C_1$ and $C_2$ overlap in engagement during the 1–2 shift and 2–1 shift and in the 3–4 and 4–3 shifts, there is no tendency for the transmission to hunt between ratios in these narrow ratio changing ranges.

While there is no engagement overlap at the point of shifting between second and third ranges, the control also prevents hunting at the 2–3 upshift and the 3–2 downshift. It will be remembered that the 2–3 shift does not occur until position "*e*" of the control is reached since the master control valve sleeve 262 remains in its lowermost position until position "*e*" is reached on upshift. On the 3–2 downshift, however, the sleeve 262 is initially in its uppermost position by reason of the pressure in the annular chamber 294 below the sleeve. Therefore, on the 3–2 downshift the sleeve groove 300 remains in communication with the valve stem groove 286 until the control position "*d*" has been reached, so that the 3–2 downshift occurs at position "*d*" as contrasted to the 2–3 upshift which occurs at position "*e.*" The difference between the upshift and downshift points is depicted in the "forward" block diagram in FIGURES 11–16. By reason of this arrangement hunting is prevented between the second and third ratio ranges.

With respect to the 3–2 downshift, as position "*d*" is reached to release the pressure in the conduit 228 and to cause the clutch $C_3$ to be disengaged, pressure is simultaneously released in the annular chamber 294, below the valve sleeve 262 which causes the valve sleeve to be immediately moved downwardly by the spring 290. This causes a very fast 3–2 downshift in the same manner as the very fast 2–3 upshift at position "*e*" of the control. Accordingly, there is no interruption of power through the transmission in the 3–2 downshift or in the 2–3 upshift.

The transmission control system 25 is so arranged that the vehicle driving engine operates at the most economical speed at any vehicle speed or load and consequently fuel consumption is maintained at a minimum. This is achieved by controlling vehicle speed ratio through combined effect of vehicle speed and accelerator position as explained. Furthermore, it should be understood that the normal vehicle engine speed will be maintained at a fairly constant level during most ordinary cruising manuevers at other than very low or very high vehicle speeds. This is because the speed ratio through the transmission is varied in accordance with torque requirements. Thus, the throttle linkage to the engine (not shown) can be arranged so that most economical engine speed is achieved over a wide range of throttle positions so that changing torque requirements are ordinarily met by changes in speed ratio through the transmission until relatively high vehicle speeds are attained. After maximum speed ratio has been attained, of course, further increases in vehicle speed are achieved by increasing the engine speed.

In order to drive the vehicle in reverse it is important, of course, to first bring the vehicle to a standstill, or substantially to a standstill. The selector lever (not shown) is then shifted to the reverse position which causes the selector valve 352 to be rotated 90° to bring the conduit 350 into communication with the conduit 356 leading to the servo for the brake $B_R$ and to cut off communication with the servo for the brake $B_F$. It is desirable to provide some impediment to movement of the selector lever to prevent it from being inadvertently moved to the reverse position. This can be achieved by requiring the operator to lift the selector lever slightly or to perform some other additional movement before the lever can be moved to the reverse position.

When the selector lever is moved to the reverse position, the transmission operates in exactly the same fashion as in forward except that the brake $B_R$ is engaged rather than the brake $B_F$. The engagement ranges of the clutches $C_1$ and $C_2$ and the brake $B_R$ are indicated in the block diagram labeled "Reverse" in FIGURES 11 and 12. Engagement of the brake $B_R$ causes reverse drive through the rearward planetary gear set 48, so that the driven shaft and the vehicle are driven in reverse. The clutches $C_1$ and $C_2$ engage and disengage in the same manner as in the first and second ranges of forward drive, and control engagement is provided for start through the start control 268 in exactly the same manner. Provision is made in the control to prevent movement of the master control valve 240 beyond position "*d*" to prevent disengagement of the brake $B_R$ and to prevent reengagement of the clutch $C_1$ at maximum ratio position in the second range of reverse drive. This can be achieved in any suitable manner such as by providing a lockout pin (not shown) for the lever 456 to prevent movement beyond the "*d*" position when the selector lever is in reverse position.

FIGURE 18 illustrates the relative amount of power carried by the variable unit 22 and the gearing unit 24. During start in either forward or reverse only a very small amount of power is carried in the variable unit so that there is no danger of exceeding the maximum torque capacity of the variable unit. The drive ratio through the variable unit does not start to increase until the overall speed ratio has reached .125 at which point the clutch $C_1$ and the brake $B_F$ or $B_R$ are fully engaged. During the first range the ratio through the variable unit is increased from minimum to maximum to provide a very smooth infinitely variable increase in the overall speed ratio without any shifting in the gearing unit. At maximum ratio about 50% of the transmission power is carried by the variable unit 22. At the 1–2 shift range all necessary portions of the transmission are synchronized and clutching overlap is provided to prevent a break in the power train during shifting. With the transmission in the second range the drive ratio in the variable unit is decreased which causes a continuing increase in the overall drive ratio through the transmission until 2–3 shift range is reached.

It will be noted in FIGURE 18 that the curve $N_V$ in the second range is below the zero point of the ordinate axis, indicating that the variable unit is feeding torque back to the input shaft. The amount of torque feed back decreases until the 2–3 shiftpoint is reached at which time the variable unit has again achieved its minimum ratio drive. At the 2–3 shipftpoint, which occurs at control position "*e*" on upshift, the clutch $C_2$ and the brake $B_F$ are disengaged and the clutches $C_1$ and $C_3$ are simultaneously engaged, so that there is no interruption of power flow.

As indicated by the curve $N_V$ the proportion of power carried by the variable unit 22 again increaes during the third range until the 3–4 shift range is reached, at which time the variable unit is transmitting approximately 50% of the total power at direct drive ratio. At the 3–4 shift range the clutch $C_1$ is disengaged and the clutch $C_2$ is engaged with overlapping as described to prevent a break in the power flow.

During speed ratio increase in the fourth range, the variable unit reduces its ratio and feeds torque back to the input shaft in decreasing amounts as the speed ratio in the variable unit decreases. This is indicated by the $N_V$ curve which is now below the line again. At the maximum overall 1.5 speed ratio the drive ratio through the variable unit has been reduced to its minimum, so that practically all of the power is transmitted through the gearing unit. Normal driving occurs at or near this ratio with the variable unit substantially "locked out" in order to obtain the very high efficiency of drive through the gearing unit.

FIGURE 18 also includes a line designated by the symbol S, illustrating the substantially straight line increase in output speed or vehicle speed as the transmission speed ratio is increased. No ordinate is shown since it will be understood that at any given engine speed an increase in speed ratio will cause an increase in output speed. The output speed at which maximum ratio is achieved will vary substantially depending upon the amount of accelerator depression during acceleration. For example, with very light accelerator depression maximum overall speed ratio might be achieved at a vehicle speed of 20 m.p.h., while with full accelerator depression maximum speed ratio might not be obtained until the vehicle speed has achieved 60 m.p.h. It should be kept in mind, however, that these values are merely for purposes of illustration and might vary widely depending upon the particular transmission and/or control configuration.

Inasmuch as the transmission of this invention utilizes positive drive throughout, engine braking is very readily obtained. Referring to FIGURE 11, for example, the vehicle brake pedal 506 is connected by any suitable type of linkage 508 to the pivot 480 which connects the balance control lever 478, through the link 482, to the balance control valve 250. The linkage 508 and the brake linkage (not shown) are arranged in such a manner that initial depression of the brake pedal 506 does not actuate the regular vehicle brakes (not shown) but instead pushes downwardly on the balance control valve 250 to move it below its normal balance condition. This introduces pump pressure into the lower servo chamber 372*b* causing the master control valve 240 to be moved upwardly to reduce the drive ratio in the transmission. In this manner a large portion of the vehicle braking can be accomplished through the transmission permitting reduced capacity vehicle brakes to be utilized and greatly reducing the wear on the brakes. After the vehicle brake pedal has been depressed through an initial range, the brake linkage will become effective to actuate the regular vehicle brakes to supplement the effect of engine braking and to bring the vehicle to a complete stop, if desired.

The brake pedal can also be used to prevent the governor 244 from increasing the speed ratio which might occur, for example, with the vehicle coasting down a steep incline when a decreased drive ratio is desired rather than an increased ratio. Thus, engine braking through the transmission is particularly effective for safe downhill driving at reduced drive ratio, thereby eliminating the necessity for applying the vehicle brakes and avoiding the dangerous condition of overheated brakes which might cause a run away vehicle.

If desired, reduction in drive ratio for increased torque capacity or for engine braking can be accomplished through the transmission selector lever (not shown) by providing an intermediate "low" drive position which can act through any suitable mechanism (not shown) for forcing the master control valve 240 back to second or third range of forward drive, for example, and for preventing upshift beyond the selected lower drive ratio. Such a low drive position is useful when it is desirable to maintain a relatively low maximum speed ratio for hauling heavy loads, for driving through mud or heavy snow, or the like.

*Supplementary creeper drive of FIGURE 20*

In some types of vehicles, for example, tractors and road building machinery, it is often desirable to provide means for achieving and maintaining an extremely low drive ratio to provide for very high torque multiplication in both forward and reverse drive. Such a "creeper" drive might be utilized, for example, in a tractor for plowing in both directions.

A creeper drive can be readily achieved with the transmission of the present invention by incorporating an additional clutch to couple the ring member 64 directly to the intermediate shaft 108 so that all power flow is directed through the variable unit 22 in series with the rear work planetary gear set 48.

Such an alternative arrangement is illustrated in FIGURE 20 which shows a modified clutching section 50$a$ which is substantially identical to the clutching section 50 of the primary embodiment with the addition of an extra multiple disc friction clutch $C_4$ for selectively coupling the ring member 64 directly to the intermediate shaft 108. In this arrangement the clutches $C_1$ and $C_2$ and $C_3$ are substantially identical to their counterparts in the first embodiment, although the piston member 158 of the prior clutch $C_1$ is modified slightly to provide a double piston member 158$a$. This member also acts as a piston member for the new clutch $C_4$ and provides a pressure servo chamber 506 in place of the balance chamber 176 of the previous embodiment. A spring 172$a$ is provided in the servo chamber 162 of the clutch $C_1$ to provide a clutch release spring for the clutch $C_4$. The release spring 172$a$ may be substantially identical to the release spring 172 so that when there is no pressure in either of the chambers 162 or 506, the springs balance one another and achieve disengagement of both of the clutches $C_1$ and $C_4$.

The clutch $C_4$ may include a plurality of externally retained annular friction clutch discs 508 interleaved with a plurality of internally retained annular friction clutch discs 510 and a clutch backup or pressure plate 512 on the opposite side of the stack of discs. A fluid conduit or passage 514 is provided and connects with the servo chamber 506 in order to permit introduction of pressure fluid in the servo chamber to engage the clutch $C_4$.

In order to accommodate the clutch $C_4$ the control 25 may be modified in any suitable manner (not shown) to cause engagement of the clutch $C_4$ along with the brake $B_F$ or the brake $B_R$ for creeper drive. This might be accomplished, for example, by providing an additional selector lever position for creeper drive (not shown) and by providing corresponding passages (not shown) in the master control valve 240 to connect the pump pressure with the servo conduit 514 for the clutch $C_4$ simultaneously with the servo conduit 350 for the brakes when the control is placed in creeper drive position.

With creeper drive selected the variable unit 22 would be maintained in its lowest drive ratio position and the power flow would proceed directly through the variable unit to the rearward planetary gear set 48 where additional torque multiplication would be achieved. If the minimum ratio of .1 in the variable unit is utilized with the particular forward drive ratio in the gear set 48 shown, a continuous torque multiplication of approximately 32 to 1 can be achieved. When the unit is shifted into reverse creeper drive with the particular rearward gear set 48 as shown, the torque multiplication would be slightly larger, because of the larger pitch diameter of the ring gear 126, but, of course, the reverse gear ratio can be made the same as the forward gear ratio, if desired, by altering the gearing.

It is also feasible to further reduce the minimum ratio in the variable drive when the control is moved to the creeper position. This might be accomplished, for example, by pivoting the lever 456 of the control linkage 242 slightly counterclockwise from the initial position "$a$." This would cause the control ring 254 of the variable control unit 238 to be moved beyond the normal minimum ratio position to further reduce the ratio. It is feasible, for example, to reduce the ratio through the variable unit sufficiently that the overall torque multiplication in creeper drive is 120 to 1 or even more.

Summation

From the foregoing disclosure of this invention it will be understood that the power split transmission and control here presented provides an extremely versatile and economical automatic transmission. Both the mechanical transmission and the control system are very much simplified over automatic transmissions which are currently in use, and the efficiency of the present automatic transmission is very much higher. For example, the efficiency of the transmission in this invention is about 96%, or higher constant over the entire normal speed ratio range of 12 to 1. Since the transmission power is constant over this full range, the maximum torque multiplication range is also approximately 12 to 1. A simple alternative construction can achieve an enormous torque multiplication for sustained creeper drive.

Since all members to be clutched during ratio changes in the gearing unit portion are synchronized at the shift-points, the transmission provides extremely smooth operation with no interruption of power flow throughout the entire range.

The power split transmission of this invention provides maximum economy. The particular combination of variable unit and gearing unit achieves power flow through the variable unit which is always below its permissible transmission capacity and at the same time provides for transmission of constant power through the combined unit throughout the normal range of speed ratios. Little or no power flows through the variable unit at zero or very low speed ratios when its capacity is low, and the power flow increases with increasing speed ratio when the capacity of the variable unit is high. Furthermore, at maximum speed ratio for normal cruising the variable unit is essentially locked up with substantially the entire power flow passing through the gearing unit in order to drastically increase the cruising efficiency.

The control system provides completely automatic ratio changing in accordance with vehicle speed and torque requirements for operation at most efficient engine speeds. Ratio changing in the variable unit is positively coordinated with ratio changing in the gearing unit to automatically achieve perfectly synchronized shift points and absolutely smooth ratio changing without any interruption in power flow through the transmission.

Variations and modifications may be effected without departing from the scope of the novel concepts of the present invention.

I claim:

1. A split power path transmission comprising a drive shaft, a driven shaft, a compound planetary gear set including a rotatable carrier element rotatably carrying a pair of coupled planet elements of different diameter, said planetary gear set also including two rotatable elements meshed with one of said planet elements and another rotatable element meshed with the other of said planet elements, a variable speed drive having a variable drive ratio and an input member coupled for direct drive by said drive shaft and an output member drivingly associated with one of said gear set elements, means coupling said drive shaft to a second of said gear set elements, means for drivingly coupling a third of said gear set elements with said driven shaft to provide a first drive range for increasing the drive speed ratio between said shafts when the drive ratio through said variable speed drive is increased and means for drivingly coupling a fourth of said gear set elements with said driven shaft to provide a second drive range for further increasing the drive speed ratio between said shafts when the drive ratio through the variable speed drive is decreased.

2. A split power path transmission comprising a drive shaft, a driven shaft, a first planetary gear set drivingly coupled with said drive shaft, a second planetary gear set operatively disposed between said first planetary gear set

23 and said driven shaft, a variable speed drive unit drivingly coupled between said drive shaft and said first planetary gear set, said variable unit having a variable drive ratio, and ratio changing means operatively associated with said planetary gear sets for providing four drive ratio ranges between said drive shaft and driven shaft, including means drivingly connecting said gear sets to said driven shaft so that the drive ratio through said variable speed drive unit is increased in the first and third of said drive ratio ranges for increasing the drive ratio between the shafts, and means drivingly connecting said gear sets to said driven shaft so that the drive ratio through said variable speed drive unit is decreased in the second and fourth of said drive ratio ranges to increase the drive ratio between said shafts.

3. A split power path transmission comprising a drive shaft, a driven shaft, a first planetary gear set drivingly coupled with said drive shaft, a second planetary gear set operatively associated between said first planetary gear set and said driven shaft, a variable speed drive unit drivingly coupled between said drive shaft and said first planetary gear set, said variable speed drive unit having a variable drive ratio changing mechanism including means drivingly connecting said second planetary gear set to said driven shaft to provide a first drive ratio range in which the drive ratio between said drive shaft and driven shaft increases with an increase in drive ratio in said variable speed drive unit and with a reduced drive ratio through said second planetary gear set, means drivingly connecting said second planetary gear set to said driven shaft to provide a second drive ratio range in which the drive ratio between said drive and driven shafts increases with a decrease in drive ratio through said variable speed drive and with a reduced drive ratio through said second planetary gear set, means drivingly connecting said second planetary gear set to said driven shaft to provide a third drive ratio range in which the drive ratio between said drive and driven shafts increases with an increase in drive ratio through said variable speed drive unit and direct drive through said second planetary gear set, and means drivingly connecting said second planetary gear set to said driven shaft to provide a fourth drive ratio range in which the drive ratio between said drive and driven shafts increases with a decrease in drive ratio through said variable speed drive unit and with direct drive through said second planetary gear set.

4. A split power path transmission according to claim 3 whereby a reverse drive ratio range is provided in which engagement of a fifth pair of said engagement devices provides an increase in drive ratio in the reverse direction between said drive and driven shafts with an increase in drive ratio in said variable speed drive unit and with a reduced drive ratio through said second planetary gear set.

5. A split power path transmission according to claim 3 including means drivingly connecting said second planetary gear set to said driven shaft to provide a first reverse drive ratio range in which the drive ratio range in the reverse direction between said drive and driven shafts increases with an increase in drive ratio in said variable speed drive unit and with a reduced drive ratio through said second planetary gear set, and means drivingly connecting said second planetary gear set to said driven shaft to provide a second reverse drive ratio range in which the drive ratio in the reverse direction between said drive and driven shafts increases with a decrease in drive ratio through said variable speed drive and with a reduced drive ratio through said second planetary gear set.

6. A variable ratio transmission including a drive shaft and driven shaft with a prime mover adapted for driving said drive shaft at speeds depending upon the position of an accelerator lever; fluid pressure actuated frictional engagement mechanism adapted for completing a power train through said transmission between said drive and driven shafts; a source of fluid pressure; and start control apparatus operatively disposed between said source of fluid pressure and said frictional engagement mechanism including a control valve operatively associated with said accelerator lever for cutting off supply of fluid pressure to said frictional engagement mechanism when said accelerator lever is released, said control valve being adapted to open amounts graduated in accordance with initial movement of said accelerator to increase the speed of said prime mover, and a fluid pressure dash pot device disposed between said start control valve and said fluid pressure actuated frictional engagement mechanism for providing a predetermined maximum rate of fluid pressure increase upon opening of said control valve.

7. In a split power path transmission disposed in a vehicle including a drive shaft and a driven shaft with a gearing unit and a variable speed drive unit drivingly coupled between said shafts, ratio control apparatus for changing the drive ratio between said shafts comprising first ratio changing mechanism operatively associated with said variable speed drive unit, second ratio changing mechanism operatively associated with said gearing unit, and master control means operatively associated with both of said ratio changing mechanisms for changing the drive ratio through said variable speed drive unit alternately in opposite directions while coordinating drive ratio changes through said gearing unit to provide a concurrent unidirectional change in drive ratio between said shafts, vehicle braking mechanism actuated by a brake lever, means operatively connecting said brake lever with said master control means for reducing the drive ratio between said shafts upon initial movement of said brake lever to provide initial vehicle braking through said reduction in the drive ratio in said transmission.

8. In a split powe rpath transmission including a drive shaft and a driven shaft with a gearing unit and a variable speed drive unit drivingly coupled between said shafts, ratio control apparatus for changing the drive ratio between said shafts comprising first ratio changing mechanism operatively associated with said variable speed drive unit, second ratio changing mechanism operatively associated with said gearing unit, and master control means operatively associated with both of said ratio changing mechanisms for changing the drive ratio through said variable speed drive unit alternately in opposite directions while coordinating drive ratio changes through said gearing unit to provide a concurrent unidirectional change in drive ratio between said shafts, said drive shaft being driven by a prime mover including an accelerator member, said second ratio changing mechanism including a plurality of selectively engageable fluid pressure actuated engagement devices, said master control means including a source of fluid pressure, an axially shiftable control valve operatively disposed between said source of fluid pressure and said engagement devices for controlling delivery of fluid under pressure to said engagement devices in a preselected pattern in accordance with the axial position of said control valve, a fluid pressure servo operatively disposed for shifting said control valve, a balance valve controllng delivery of fluid pressure from said source to said servo to control the direction of movement of said control valve, speed responsive means operatively associated with said balance valve and responsive to the speed of one of said shafts for biasing said control valve in a direction for increasing the drive ratio between said shafts in response to increases in speed of said one shaft, and means operatively associating said accelerator lever with said balance valve for biasing said valve in a direction for decreasing the drive ratio between said shafts in response to increased accelerator movement.

9. A split power path transmission comprising a drive shaft, a driven shaft, a planetary gear set including a rotatable carrier element rotatably carrying a planet gear element, a ring gear member meshing with said planet gear element and a sun gear member meshing with said planet gear element, a variable speed drive unit having a variable drive ratio and including an input member driven by said drive shaft and an output member driving said ring gear member, means drivingly coupling said drive shaft with said carrier element, means for drivingly coupling said carrier element with said driven shaft to provide a first drive range for increasing the drive speed ratio between said shafts when the drive ratio through said variable speed drive unit is increased and means for drivingly coupling said sun gear with said driven shaft to provide a second drive range for further increasing the drive speed ratio between said shafts when the drive ratio through said variable speed drive unit is decreased.

References Cited by the Examiner
UNITED STATES PATENTS

| | | | |
|---|---|---|---|
| 2,164,504 | 7/1939 | Dodge | 74—690 |
| 2,260,759 | 10/1941 | Surdy | 192—4 |
| 2,755,683 | 7/1956 | Ryan | 74—690 X |
| 2,833,160 | 5/1958 | Morgan | 74—681 |
| 2,888,834 | 6/1959 | Lowe. | |
| 2,890,601 | 6/1959 | Forster | 74—688 |
| 2,894,415 | 7/1959 | Miller | 74—688 |
| 2,894,500 | 7/1959 | Nallinger | 123—98 X |
| 2,972,905 | 2/1961 | Bullard | 74—687 X |
| 2,990,925 | 7/1961 | Bernotas. | |
| 3,006,206 | 10/1961 | Kelley et al. | |

DON A. WAITE, *Primary Examiner.*